United States Patent
Miranda et al.

(10) Patent No.: US 11,780,942 B2
(45) Date of Patent: Oct. 10, 2023

(54) ZIEGLER-NATTA PRODUCED POLYETHYLENE AND METHODS THEREOF

(71) Applicant: Braskem S.A., Camaçari (BR)

(72) Inventors: Márcia Silva Lacerda Miranda, São Paulo (BR); Olavo Martins Junior, São Paulo (BR); Yue Yu, Villeurbanne (FR); Christophe Boisson, Villeurbanne (FR); Timothy Frederick Llewellyn McKenna, Villeurbanne (FR)

(73) Assignee: Braskem S.A., Camaçari (BR)

(*) Notice: Subject to any disclaimer, the term of this patent is extended or adjusted under 35 U.S.C. 154(b) by 215 days.

(21) Appl. No.: 17/080,594

(22) Filed: Oct. 26, 2020

(65) Prior Publication Data

US 2021/0122858 A1 Apr. 29, 2021

Related U.S. Application Data

(60) Provisional application No. 62/926,251, filed on Oct. 25, 2019.

(51) Int. Cl.
*C08F 210/16* (2006.01)
*C08F 4/76* (2006.01)
*C08F 210/08* (2006.01)

(52) U.S. Cl.
CPC .............. *C08F 210/16* (2013.01); *C08F 4/76* (2013.01); *C08F 210/08* (2013.01); *C08F 2500/05* (2013.01); *C08F 2500/37* (2021.01)

(58) Field of Classification Search
CPC . C08F 210/16; C08F 2500/05; C08F 2500/37
See application file for complete search history.

(56) References Cited

U.S. PATENT DOCUMENTS

| 8,546,499 B2 | 10/2013 | Garroff et al. |
| 2006/0166812 A1 | 7/2006 | Braganca et al. |

FOREIGN PATENT DOCUMENTS

| CN | 1751072 A | 3/2006 | |
| CN | 102428107 A | 4/2012 | |
| EP | 1595897 A1 | 11/2005 | |
| EP | 1515995 B1 | 5/2010 | |
| EP | 2 246 368 A1 * | 11/2010 | ............. C08F 10/00 |
| EP | 2246369 A1 | 11/2010 | |
| JP | 2014129875 A | 7/2014 | |
| WO | 2004/000893 A1 | 12/2003 | |
| WO | 2018/151903 A1 | 8/2018 | |
| WO | 2019/099250 A1 | 5/2019 | |
| WO | 2020/144571 A1 | 7/2020 | |

OTHER PUBLICATIONS

International Search Report and Written Opinion issued in International Application No. PCT/IB2020/020068, dated Mar. 25, 2021 (26 pages).

* cited by examiner

*Primary Examiner* — Rip A Lee
(74) *Attorney, Agent, or Firm* — Osha Bergman Watanabe & Burton LLP

(57) ABSTRACT

A process of producing a composition comprising a copolymer of ethylene and one or more C4-C8 α-olefins, may include copolymerizing the ethylene and the one or more C4-C8 α-olefins in the presence of a procatalyst and an alkylaluminum cocatalyst. The procatalyst may be a Ti-containing Ziegler Natta procatalyst and the polymerization may include the procatalyst and the alkylaluminum cocatalyst in amounts such that a molar ratio of Al:Ti ranges from about 0.5 to about 50.0.

35 Claims, 14 Drawing Sheets

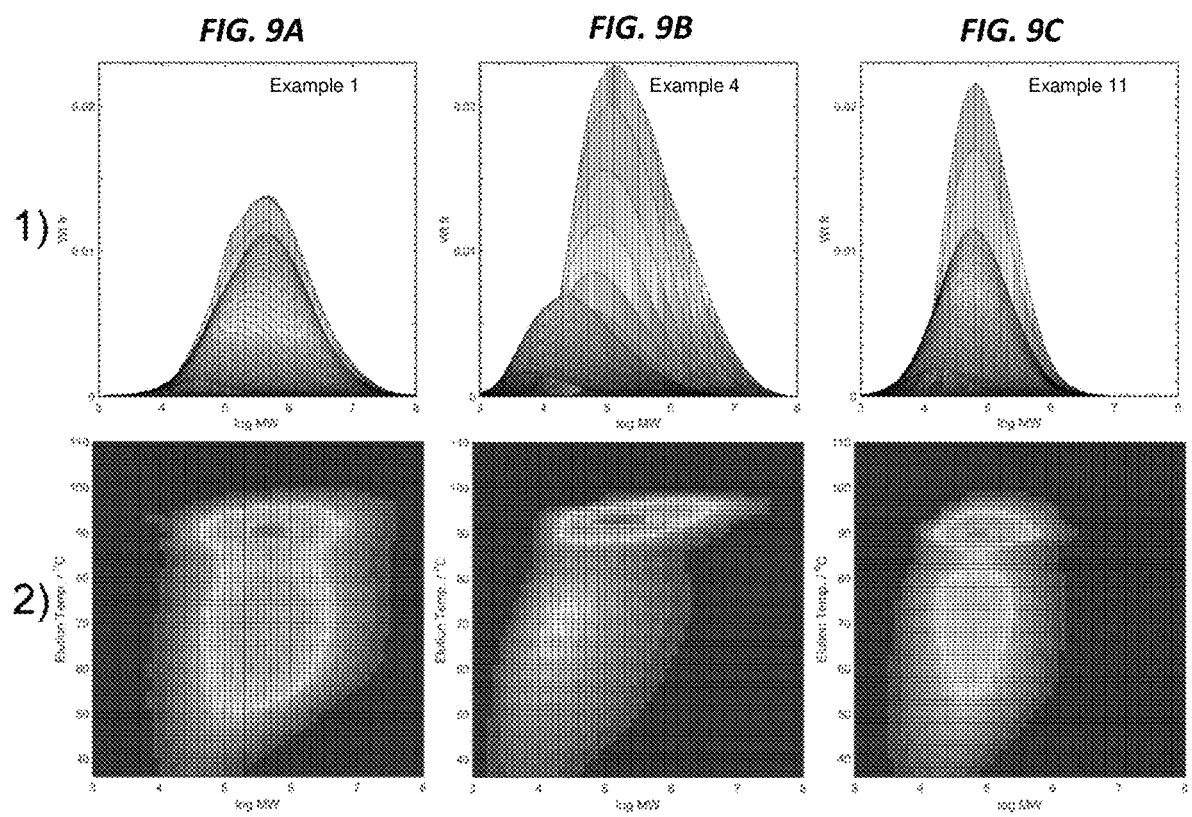

|  | BINDING ENERGY (Ti 2p 3/2) | FWHM (eV) |
|---|---|---|
| Procatalyst A | 458.65 | 3.0 |

*FIG. 12*

|  | INTENSITY OF THE SIGNALS | | | | INTENSITY RATIO OF THE SIGNALS | | |
|---|---|---|---|---|---|---|---|
|  | C 1s | Si 2p | Ti 2p 3/2 | Mg KLL | Mg/Si | Ti/Si | Mg/Ti |
| Procatalyst A | 4300 | 5754 | 2350 | 1343 | 0.23 | 0.41 | 0.57 |

*FIG. 13*

|  | Procatalyst A | | | | |
|---|---|---|---|---|---|
| Wave number (nm) | 257.9 | 287.6 | 311.8 | 331.7 | 343.4 |
| Chemical species | Pentacoordinated Ti | Pentacoordinated Ti | Oligomerical octahedric Ti (IV) | Oligomerical octahedric Ti (IV) | Oligomerical octahedric Ti (IV) |
| Geometry | Trigonal bipyramidal | Trigonal bipyramidal | oligomeric octahedral | oligomeric octahedral | oligomeric octahedral |
| Concentration (%) | 21.6 | 25.9 | 13.4 | 4.2 | 36.0 |
| Site type (from figure 2) | Type 2 | Type 2 | Type 1 | Type 1 | Type 1 |

| EXAMPLE | Catalyst | Aluminum Alkyl | Al/Ti [mol/mol] | T [°C] | H2 | Gas Composition | Gas Composition - pressure [bar] | C4/(C4+C2) [%] | Polymer mass [g] | C4" [mol%]a) | Tm [°C] | wc [%] | Mn [kDa] | Mw [kDa] | MWD |
|---|---|---|---|---|---|---|---|---|---|---|---|---|---|---|---|
| 1 | A | TEAL | 6 | 85 | No | C2/C4/C3H8 | 4/2/15.29 | 33 | 8.4 | 6.4 | 112.28 | 28.65 | 236 | 489 | 2.1 |
| 2 | A | TEAL | 12 | 85 | No | C2/C4/C3H8 | 4/2/15.32 | 33 | 10.1 | 7.8 | 114.06 | 29.40 | 55 | 231 | 4.2 |
| 3 | A | TEAL | 24 | 85 | No | C2/C4/C3H8 | 4/2/15.28 | 33 | 9.4 | N.A. | 116.20 | 32.51 | 22 | 150 | 6.8 |
| 4 | A | TEAL | 50 | 85 | No | C2/C4/C3H8 | 4/2/15.21 | 33 | 4.5 | 7.8 | 118.81 | 34.78 | 4 | 117 | 29.3 |
| 5 | A | TEAL | 3 | 85 | Yes | C2/C4/H2/C3H8 | 4/1/0.76/15.22 | 20 | 23.2 | 3.5 | 122.67 | 37.75 | 31 | 109 | 3.5 |
| 6 | A | TEAL | 6 | 85 | Yes | C2/C4/H2/C3H8 | 4/1/0.76/15.24 | 20 | 13.2 | 4.0 | 122.60 | 40.49 | 27 | 103 | 3.8 |
| 7 | A | TEAL | 12 | 85 | Yes | C2/C4/H2/C3H8 | 4/1/0.76/15.37 | 20 | 16.0 | 4.6 | 122.82 | 41.83 | N.A. | N.A. | N.A. |
| 8 | A | TEAL | 24 | 85 | Yes | C2/C4/H2/C3H8 | 4/2/0.76/15.24 | 20 | 10.5 | N.A. | 123.95 | 43.50 | 8 | 73 | 9.1 |
| 9 | A | TEAL | 50 | 85 | Yes | C2/C4/H2/C3H8 | 4/1/0.76/15.32 | 20 | 12.6 | 3.6 | 124.25 | 43.80 | 6 | 59 | 9.8 |
| 10 | A | TEAL | 3 | 85 | Yes | C2/C4/H2/C3H8 | 4/2/0.76/15.49 | 33 | 8.6 | 6.3 | 120.85 | 30.37 | 45 | 200 | 4.4 |
| 11 | A | TEAL | 6 | 85 | Yes | C2/C4/H2/C3H8 | 4/2/0.75/15.32 | 33 | 12.3 | 7.4 | 121.62 | 28.72 | 21 | 94 | 4.5 |
| 12 | A | TEAL | 12 | 85 | Yes | C2/C4/H2/C3H8 | 4/2/0.77/15.48 | 33 | 10.4 | 8.8 | 122.75 | 27.22 | 9 | 54 | 6.0 |
| 13 | A | TEAL | 24 | 85 | Yes | C2/C4/H2/C3H8 | 4/2/0.76/15.58 | 33 | 9.2 | 6.6 | 123.79 | 29.89 | 7 | 48 | 6.9 |
| 14 | A | TEAL | 50 | 85 | Yes | C2/C4/H2/C3H8 | 4/2/0.76/15.37 | 33 | 9.3 | 7.5 | 124.03 | 30.31 | 5 | 35 | 7.0 |
| 15 | A | TIBA | 6 | 85 | Yes | C2/C4/H2/C3H8 | 4/1/0.76/15.33 | 20 | 8.0 | 3.6 | 122.32 | 40.55 | 52 | 156 | 3.0 |
| 16 | A | TIBA | 12 | 85 | Yes | C2/C4/H2/C3H8 | 4/1/0.76/15.25 | 20 | 19.0 | 4.1 | 122.72 | 41.26 | N.A. | N.A. | N.A. |
| 17 | A | TIBA | 50 | 85 | Yes | C2/C4/H2/C3H8 | 4/1/0.77/15.59 | 20 | 10.5 | 3.1 | 123.81 | 41.59 | 10 | 83 | 8.3 |
| 18 | A | TIBA | 6 | 85 | Yes | C2/C4/H2/C3H8 | 4/2/0.76/15.67 | 33 | 15.3 | N.A. | 120.55 | 28.73 | 26 | 92 | 3.5 |
| 19 | A | TIBA | 12 | 85 | Yes | C2/C4/H2/C3H8 | 4/1.99/0.76/15.50 | 33 | 13.3 | 7.8 | 122.59 | 27.31 | N.A. | N.A. | N.A. |
| 20 | A | TIBA | 50 | 85 | Yes | C2/C4/H2/C3H8 | 4/1.99/0.76/15.49 | 33 | 11.3 | 6.3 | 123.54 | 29.67 | 7 | 62 | 8.9 |
| Comp. 1 | Comp. B | TEAL | 12 | 85 | No | C2/C4 | 4/0.98 | 20 | 14.8 | 4.8 | 120.22 | 33.99 | 82 | 588 | 7.2 |
| Comp. 2 | Comp. B | TEAL | 12 | 85 | No | C2/C4 | 4/1 | 20 | 26.8 | N.A. | 120.26 | 33.10 | 83 | 401 | 4.8 |
| Comp. 3 | Comp. B | TEAL | 12 | 85 | No | C2/C4/C3H8 | 4/1/15.26 | 20 | 14.1 | N.A. | 120.39 | 33.39 | 67 | 1442 | 21.5 |
| Comp. 4 | Comp. B | TEAL | 12 | 85 | Yes | C2/C4/H2/C3H8 | 4/1.03/0.76/15.24 | 20 | 8.9 | 4.3 | 123.50 | 39.91 | 38 | 96 | 2.5 |
| Comp. 5 | Comp. B | TEAL | 12 | 85 | Yes | C2/C4/H2/C3H8 | 4/2.04/0.77/15.39 | 33 | 27.8 | 9.52 | 121.83 | 15.65 | 36 | 113 | 3.1 |
| Comp. 6 | Comp. B | TEAL | 29 | 85 | Yes | C2/C4/H2/C3H8 | 4/2.03/0.76/15.49 | 33 | 9.5 | 9.52 | 121.59 | 27.67 | 35 | 110 | 3.1 |
| Comp. 7 | Comp. B | TEAL | 29 | 85 | Yes | C2/C4/H2/C3H8 | 4/1.47/0.76/15.48 | 27 | 10.8 | 7.6 | 122.73 | 26.86 | 38 | 126 | 3.3 | a) C4" means butene-1 incorporation measured by $^{13}$C NMR
N.A. - Not analyzed

FIG. 16

| EXAMPLE | Catalyst | Aluminum Alkyl | Al/Ti [mol/mol] | T [°C] | H2 | Gas Composition | Gas Composition-pressure [bar] | C4/(C4+C2) [%] | C4= [mol%]a) | Soluble Fraction, Fsolb | | Crystalline Fractionb | | Overallb |
|---|---|---|---|---|---|---|---|---|---|---|---|---|---|---|
| | | | | | | | | | | A1/Atotal [%] | CH3 /1000TC | Lower T°C A2/Atotal [%] | Higher T°C A3/Atotal [%] | CH3 /1000TC |
| 1 | A | TEAL | 6 | 85 | No | C2/C4/C3H8 | 4/2/15.29 | 33 | 6.4 | 33.15 | 176 | 34.76 | 32.09 | 61 |
| 2 | A | TEAL | 12 | 85 | No | C2/C4/C3H8 | 4/2/15.32 | 33 | 7.8 | 38.61 | 157 | 30.00 | 31.39 | 69 |
| 3 | A | TEAL | 24 | 85 | No | C2/C4/C3H8 | 4/2/15.28 | 33 | N.A. | 44.22 | 156 | 25.10 | 30.67 | 78 |
| 4 | A | TEAL | 50 | 85 | No | C2/C4/C3H8 | 4/2/15.21 | 33 | 7.8 | 48.97 | 152 | 21.22 | 29.82 | 79 |
| 6 | A | TEAL | 6 | 85 | Yes | C2/C4/H2/C3H8 | 4/2/0.75/15.32 | 20 | 4.0 | 17.14 | 45 | 42.91 | 39.96 | 22 |
| 7 | A | TEAL | 12 | 85 | Yes | C2/C4/H2/C3H8 | 4/2/0.77/15.48 | 20 | 4.6 | 27.65 | 56 | 44.55 | 27.79 | 26 |
| 8 | A | TEAL | 24 | 85 | Yes | C2/C4/H2/C3H8 | 4/2/0.76/15.58 | 20 | N.A. | 22.46 | 94 | 30.33 | 47.21 | 33 |
| 9 | A | TEAL | 50 | 85 | Yes | C2/C4/H2/C3H8 | 4/2/0.76/15.47 | 20 | 3.6 | 28.27 | 103 | 29.60 | 42.13 | 38 |
| 11 | A | TEAL | 6 | 85 | Yes | C2/C4/H2/C3H8 | 4/2/0.75/15.32 | 33 | 7.4 | 44.51 | 123 | 36.00 | 19.49 | 61 |
| 12 | A | TEAL | 12 | 85 | Yes | C2/C4/H2/C3H8 | 4/2/0.77/15.48 | 33 | 8.8 | 51.47 | 120 | 30.31 | 18.22 | 65 |
| 13 | A | TEAL | 24 | 85 | Yes | C2/C4/H2/C3H8 | 4/2/0.76/15.58 | 33 | 6.6 | 47.01 | 111 | 30.49 | 22.51 | 58 |
| 14 | A | TEAL | 50 | 85 | Yes | C2/C4/H2/C3H8 | 4/2/0.76/15.57 | 33 | 7.5 | 52.64 | 111 | 30.01 | 17.35 | 62 | a) C4= means butene-1 incorporation measured by $^{13}$C NMR
b) Data from CEF: integrated areas A1/Atotal, A2/Atotal and A3/Atotal

FIG. 17

| EXAMPLE | Catalyst | Aluminum Alkyl | Al/Ti [mol/mol] | T [°C] | H2 | Gas Composition | Gas Composition-pressure [bar] | C4/(C4+C2) [%] | Polymer mass [g] | C4= [mol%]a) | Soluble Fraction, Fsolb | | Crystalline Fractionb | | Overallb |
|---|---|---|---|---|---|---|---|---|---|---|---|---|---|---|---|
| | | | | | | | | | | | A1/Atotal [%] | CH3 /1000TC | Lower T°C A2/Atotal [%] | Higher T°C A3/Atotal [%] | CH3 /1000TC |
| 7 | A | TEAL | 12 | 85 | Yes | C2/C4/H2/C3H8 | 4/2/0.75/15.32 | 20 | 16.0 | 4.6 | 17 | 43 | 44 | 39 | 22 |
| Comp. 4 | Comp. B | TEAL | 12 | 85 | Yes | C2/C4/H2/C3H8 | 4/2/1.03/0.76/15.24 | 20 | 8.9 | 4.3 | 24 | 61 | 31 | 45 | 30 | a) C4= means butene-1 incorporation measured by $^{13}$C NMR
b) Data from CEF: integrated areas A1/Atotal, A2/Atotal and A3/Atotal

| T (°C) | Example 1 Wt% | Example 1 CH3/1000TC | Example 1 Integrated Area | | Example 4 Wt% | Example 4 CH3/1000TC | Example 4 Integrated Area | | Example 11 Wt% | Example 11 CH3/1000TC | Example 11 Integrated Area | |
|---|---|---|---|---|---|---|---|---|---|---|---|---|
| 35 | 23.14 | 66.3 | Sx1/Stotal | 0.20 | 38.36 | 76.8 | Sx1/Stotal | 0.39 | 33.99 | 76.9 | Sx1/Stotal | 0.35 |
| 40 | 0.72 | 60.4 | | | 1.05 | 33.8 | | | 1.18 | 35 | | |
| 43 | 0.73 | 59 | | | 0.89 | 32.9 | | | 1.12 | 37.1 | | |
| 46 | 1.08 | 47.6 | | | 1.2 | 32.4 | | | 1.55 | 23.3 | | |
| 49 | 1.55 | 47.8 | | | 1.48 | 30 | | | 1.99 | 25.4 | | |
| 52 | 2.13 | 44.7 | | | 1.78 | 30.5 | | | 2.41 | 19.8 | | |
| 55 | 2.94 | 43.2 | | | 2.08 | 28.2 | | | 2.88 | 20.9 | | |
| 58 | 3.87 | 33.7 | | | 2.38 | 25.8 | | | 3.35 | 23.5 | | |
| 61 | 4.61 | 31.7 | Sx2/Stotal | 0.53 | 2.65 | 22.4 | Sx2/Stotal | 0.31 | 3.7 | 19.7 | Sx2/Stotal | 0.43 |
| 64 | 5.09 | 31.7 | | | 2.84 | 23.1 | | | 3.99 | 20.8 | | |
| 67 | 5.5 | 31.9 | | | 3.01 | 23.5 | | | 4.21 | 21.5 | | |
| 70 | 5.7 | 28.8 | | | 3.12 | 18 | | | 4.43 | 17.5 | | |
| 73 | 5.66 | 29.1 | | | 3.2 | 19.7 | | | 4.63 | 15.7 | | |
| 76 | 5.21 | 29.2 | | | 3.09 | 16.4 | | | 4.7 | 14.3 | | |
| 79 | 4.64 | 39.9 | | | 2.62 | 14.5 | | | 4.27 | 14.1 | | |
| 82 | 4.03 | 45.5 | Sx3/Stotal | 0.27 | 2.04 | 10.2 | Sx3/Stotal | 0.30 | 3.27 | 16.1 | Sx3/Stotal | 0.22 |
| 85 | 3.81 | 33.2 | | | 1.83 | 16.4 | | | 2.67 | 10.8 | | |
| 88 | 4.65 | 33.4 | | | 2.47 | 8.9 | | | 3.62 | 10.1 | | |
| 91 | 7.23 | 29.8 | | | 6.55 | 8.1 | | | 7.91 | 6.5 | | |
| 94 | 5.37 | 39.1 | | | 10.99 | 7 | | | 2.89 | 7.2 | | |
| 97 | 2.32 | 60.5 | | | 5.91 | 12.1 | | | 1.24 | 9 | | |
| 100 | 0 | 0 | | | 0.47 | - | | | 0 | 0 | | |
| whole sample | 100 | 42.5 | | | 100 | 38.5 | | | 100 | 35.9 | | |

Data from CFC analysis integrated areas Sx1/Stotal, Sx2/Stotal and Sx3/Stotal from TREF

*FIG. 18*

ZIEGLER-NATTA PRODUCED POLYETHYLENE AND METHODS THEREOF

BACKGROUND

Polyethylene is the most widely used thermoplastic polymer in the world, with numerous applications products ranging from clear food wrap and plastic bags to laundry detergent bottles and automobile fuel tanks. Among the different polyethylene types, linear low-density polyethylene (LLDPE) represents almost 30% of the total polyethylene and the development of new procatalysts and process technologies has motivated the continuous improvement of its properties and the ability to tailor it for a wide range of applications. These resins represented a considerable advance in physical properties over the long chain branched low density polyethylenes (LDPEs), made by conventional high-pressure process.

LLDPE may be prepared by the polymerization of ethylene with one or more alpha-olefins, such as butene-1, hexene-1, octene-1, in the presence of procatalyst compositions, which have essentially two components: a compound of a transition metal belonging to any of groups 4 to 6 of the Periodic Table of Elements which is often called a procatalyst, and a compound of a metal belonging to groups 1, 2 or 13 which is the cocatalyst (activator and scavenger). Examples of procatalysts include Ziegler-Natta procatalysts, characterized by having multiple active sites, and single site procatalysts, such as metallocenes or post-metallocenes.

However, the LLDPE prepared by conventional types of Ziegler-Natta procatalysts tend to feature comonomers that are irregularly over the molecule chains. This yields copolymers with uneven or poor comonomer composition distribution (CCD) or short chain branching distribution (SCBD). Comonomer composition distribution (CCD) refers to the distribution of comonomer between copolymer molecules and the distribution of comonomer within each polymer molecule. This may be detected, for example, by CFC (Cross Fractionation Chromatography), TREF (Temperature Rising Elution Fractionation) and Crystallization Elution Fractionation (CEF) methods. Short chain branching distribution (SCBD) refers to the distribution of comonomer between different molecular weight polymer molecules. The SCBD may be evaluated with GPC-FTIR (Gel Permeation Chromatography using a Fourier transform infrared spectroscopy detector). CCD and SCBD both effect numerous polymer properties, such as crystallinity, optical properties, toughness, melt processability and many other properties as well, which, in turn, determine its applicability for commercial products. Optimizing the properties of LLDPE is usually performed to match the required product specifications.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to processes of producing a composition that includes a copolymer of ethylene and one or more C4-C8 α-olefins, the processes including copolymerizing the ethylene and the one or more C4-C8 α-olefins in the presence of a procatalyst and an alkylaluminum cocatalyst. The procatalyst may be a Ti-containing Ziegler Natta procatalyst and the polymerization may include the procatalyst and the alkylaluminum cocatalyst in amounts such that a molar ratio of Al:Ti ranges from about 0.5 to about 50.0. The composition may satisfy one or more of the following as determined by Cross Fractionation Chromatography (CFC): the weight average molecular weight (Mw) of a Room Temperature soluble fraction, eluted at 35° C. to 40° C., is at least 70 kDa, and the ratio $S\times1/Stotal$ is 0.35 or less, where $S\times1$ is the sum of the total peak areas of the components that are eluted at 35° C. to 40° C., and Stotal is the sum of the total peak areas of components that are eluted at 0 to 120° C.; the weight average molecular weight (Mw) of the Fraction eluted at 43° C. to 79° C., ranges from 140 kDa to 1750 kDa, and the ratio $S\times2/Stotal$ is 0.43 or more, where $S\times2$ is the sum of the total peak areas of the components that are eluted at 43° C. to 79° C.; and the weight average molecular weight (Mw) of the Fraction eluted at 82° C. to 120° C. ranges from 1800 kDa to 3600 kDa and the ratio $S\times3/Stotal$ ranges from 0.20 to 0.28, where $S\times3$ is the sum of the total peak areas of the components that are eluted at 82° C. to 120° C.

In another aspect, embodiments disclosed herein relate to a process of producing a composition that includes a copolymer of ethylene and one or more C4-C8 α-olefins, the process including: copolymerizing the ethylene and the one or more C4-C8 α-olefins in the presence of a procatalyst and an alkylaluminum cocatalyst, wherein the procatalyst is a Ti-containing Ziegler Natta procatalyst, wherein the polymerization comprises the procatalyst and the alkylaluminum cocatalyst in amounts such that a molar ratio of Al:Ti ranges from about 0.5 to about 50.0, and wherein the composition has, according to Gel Permeation Chromatography coupled with Fourier transform infrared spectroscopy (GPC-FTIR), an angular coefficient b that ranges from −5 to 5 over a molecular weight (M) range of log(M) of 3.5 to 5.5, where the angular coefficient b is provided by a linear regression of the curve obtained by plotting short chain branches per 1000 total carbon atoms (SCB/1000TC) vs. log(M) according to equation SCB/1000TC=b log(M)+a, where a is a linear coefficient, and wherein the composition has a molecular weight distribution ranging from about 3 to 10.

In another aspect, embodiments disclosed herein relate to compositions that include a copolymer of ethylene and one or more C4-C8 α-olefins. The compositions may satisfy one or more of the following as determined by Cross Fractionation Chromatography (CFC): the weight average molecular weight (Mw) of a Room Temperature soluble fraction, eluted at 35° C. to 40° C., is at least 70 kDa, and the ratio $S\times1/Stotal$ is 0.35 or less, where $S\times1$ is the sum of the total peak areas of the components that are eluted at 35° C. to 40° C., and Stotal is the sum of the total peak areas of components that are eluted at 0 to 120° C.; the weight average molecular weight (Mw) of the Fraction eluted at 43° C. to 79° C., ranges from 140 kDa to 1750 kDa, and the ratio $S\times2/Stotal$ is 0.43 or more, where $S\times2$ is the sum of the total peak areas of the components that are eluted at 43° C. to 79° C.; and the weight average molecular weight (Mw) of the Fraction eluted at 82° C. to 120° C. ranges from 1800 kDa to 3600 kDa and the ratio $S\times3/Stotal$ ranges from 0.20 to 0.28, where $S\times3$ is the sum of the total peak areas of the components that are eluted at 82° C. to 120° C.

In a further aspect, embodiments disclosed herein relate to articles that include a composition including a copolymer of ethylene and one or more C4-C8 α-olefins. The composition may satisfy one or more of the following as determined by Cross Fractionation Chromatography (CFC): the weight average molecular weight (Mw) of a Room Temperature soluble fraction, eluted at 35° C. to 40° C., is at least 70 kDa, and the ratio Sx1/Stotal is 0.35 or less, where Sx1 is the sum of the total peak areas of the components that are eluted at 35° C. to 40° C., and Stotal is the sum of the total peak areas of components that are eluted at 0 to 120° C.; the weight average molecular weight (Mw) of the Fraction eluted at 43° C. to 79° C., ranges from 140 kDa to 1750 kDa, and the ratio Sx2/Stotal is 0.43 or more, where Sx2 is the sum of the total peak areas of the components that are eluted at 43° C. to 79° C.; and the weight average molecular weight (Mw) of the Fraction eluted at 82° C. to 120° C. ranges from 1800 kDa to 3600 kDa and the ratio Sx3/Stotal ranges from 0.20 to 0.28, where Sx3 is the sum of the total peak areas of the components that are eluted at 82° C. to 120° C.

Other aspects and advantages of the claimed subject matter will be apparent from the following description and the appended claims.

BRIEF DESCRIPTION OF DRAWINGS

FIG. 7A is Example 1, FIG. 7B is Example 4.

FIGS. 9A-C depict 2D projections of the 3D CFC plots, for the copolymers of Example 1, Example 4 and Example 11. 1) Weight fraction distribution over molecular weight, excluding Room Temperature soluble fraction, $F_{sol}$; 2) Correlation between elution temperature and molecular weight distribution, excluding Room Temperature soluble fraction, $F_{sol}$. FIG. 9A is Example 1, FIG. 9B is Example 4, and FIG. 9C is Example 11.

FIG. 10A is Example 1, FIG. 10B is Example 4, and FIG. 10C is Example 11.

FIG. 12 is a table depicting data extracted from X-ray photoelectron spectroscopy (XPS) of the procatalyst A.

FIG. 13 is a table depicting data extracted from X-ray photoelectron spectroscopy (XPS) of the procatalyst A.

FIG. 14 is a table depicting data extracted from UV-VIS spectrum of the procatalyst A.

FIG. 15 is a table showing results from copolymer of ethylene with butene-1 prepared with the procatalyst A with TEAL or TIBA as co-catalyst, at two different gas compositions (20% and 33% C4 in C2/C4 mixture).

FIG. 16 shows CEF data of copolymers of ethylene with butene-1 prepared with the procatalyst A activated with TEAL, at various Al/Ti ratio.

FIG. 17 shows CEF data of copolymers of ethylene with butene-1 prepared with the procatalyst A activated with TEAL compared to procatalyst comparative B.

FIG. 18 is a table showing CFC data of copolymers of one or more embodiments that are prepared with a procatalyst having two different Al/Ti ratios both without $H_2$ and with $H_2$.

DETAILED DESCRIPTION

Figure 1A:
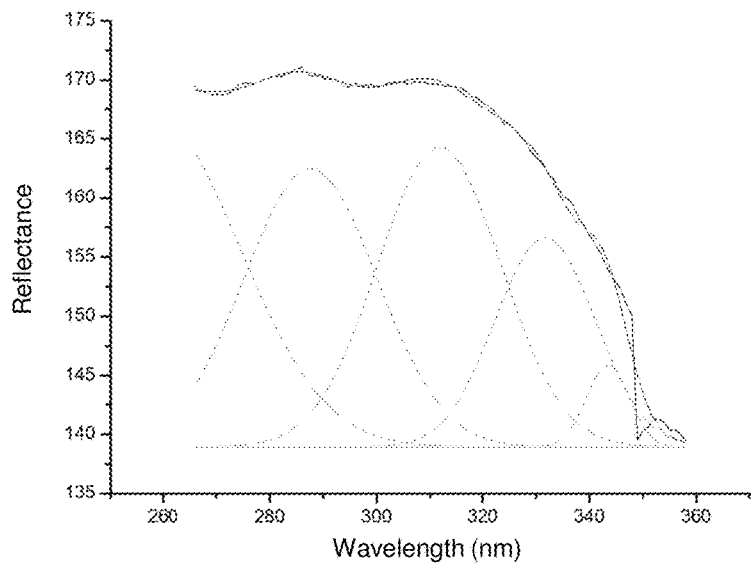
FIGS. 1A-B depict a UV-VIS (DRS) spectrum of procatalyst A of one or more embodiments.

In one aspect, embodiments disclosed herein relate to processes of producing a composition comprising a copolymer of ethylene and one or more C4-C8 α-olefins. In one or more embodiments, the process comprises copolymerizing the ethylene and the one or more C4-C8 α-olefins in the presence of a procatalyst and an alkylaluminum cocatalyst.

In another aspect, embodiments disclosed herein relate to compositions comprising a copolymer of ethylene and one or more C4-C8 α-olefins that are produced using a procatalyst that is a Ti-containing Ziegler Natta procatalyst. In a further aspect, embodiments disclosed herein relate to articles that comprise compositions including a copolymer of ethylene and one or more C4-C8 α-olefins.

One or more embodiments of the present disclosure may provide compositions with a more homogeneous CCD and SCBD than is conventionally found in the art. As a consequence of the improved CCD, in one or more embodiments, even with reasonable high comonomer contents, a decreased amount of soluble fraction may be achieved.

Compositions and Properties Thereof

One or more embodiments of the present disclosure are directed to compositions that comprise an ethylene-based copolymer. In some embodiments, the resin composition may comprise a copolymer of ethylene and one or more comonomers. The comonomers may be α-olefins. In particular embodiments, the resin composition may comprise a copolymer of ethylene and one or more C4-C8 α-olefins. In some embodiments, the copolymer may consist essentially of ethylene and one or more C4-C8 α-olefins. In further embodiments, the copolymer may consist of ethylene and one or more C4-C8 α-olefins. The α-olefins of some embodiments may be selected from the group consisting of 1-butene, 1-hexene, and 1-octene, and may preferably be 1-butene or 1-hexene. In some embodiments, the compositions may consist essentially of a copolymer of ethylene and one or more C4-C8 α-olefins. In particular embodiments, the compositions of the present disclosure may consist of a copolymer of ethylene and one or more C4-C8 α-olefins.

In one or more embodiments, polyethylene-based resin compositions in accordance with the present disclosure may comprise a copolymer that includes a monomeric unit derived from one of the one or more C4-C8 α-olefins in an amount of 1 to 10 mole % (mol %), relative to the copolymer, as measured by $^{13}$C NMR. In particular embodiments, copolymers may comprise the monomeric unit incorporated into the polymer ranging from a lower limit of any of 0.5, 1.0, 2.0, 3.0, or 5.0 mol % to an upper limit of any of 2.0, 3.0, 5.0, 6.0, 8.0, or 10.0 mol %, where any lower limit may be used with any mathematically-compatible upper limit. The copolymers of one or more embodiments may comprise two or more monomeric units that are derived from different α-olefins.

In one or more embodiments, polyethylene-based resin compositions in accordance with the present disclosure may have a total comonomer content, as measured by FTIR according to ASTM D6645, ranging from about 0.1 to 15% by weight (wt. %), relative to the total weight of the copolymer. In particular embodiments, polyethylene-based resin compositions may have a total comonomer content incorporated into the copolymer ranging from a lower limit of any of 0.5, 1.0, 2.0, 3.0, or 5.0 wt. % to an upper limit of any of 3.0, 5.0, 7.5, 10.0, or 15.0 wt. %, where any lower limit may be used with any upper limit. In some embodiments, ethylene-based copolymers may have a total comonomer content incorporated in the copolymer ranging from 1.0 to 10.0 wt. %.

Polyethylene-based resin compositions in accordance with the present disclosure may optionally further comprise one or more additives that modify various physical and/or chemical properties of the composition. Such additives may be selected from, for example, flow lubricants, antistatic agents, clarifying agents, nucleating agents, beta-nucleating agents, slippage agents, antioxidants, antacids, light stabilizers, IR absorbers, silica, titanium dioxide, organic dyes, organic pigments, inorganic dyes, inorganic pigments, and combinations thereof. One of ordinary skill in the art will appreciate, with the benefit of this disclosure, that the choice of additive may be dependent upon the intended use of the composition and/or articles produced therefrom. It will also be appreciated that such additives are not limited to those described above.

Polyethylene-based resin compositions in accordance with embodiments of the present disclosure will generally possess physical properties suitable for the intended use of the composition and the articles produced therefrom. One of ordinary skill in the art, with the benefit of this present disclosure, will appreciate that altering the relative amounts and/or identities of the components of a polymer composition will influence the resulting properties of the composition.

In one or more embodiments, polyethylene-based resin compositions in accordance with the present disclosure may have, according to Cross Fractionation Chromatography (CFC), a room temperature soluble fraction, which is eluted at 35° C. to 40° C., having a weight average molecular weight ($M_w$) of at least 50 kDa, at least 60 kDa, at least 70 kDa, at least 80 kDa, or at least 100 kDa. The room temperature soluble fraction of one or more embodiments may also have a ratio Sx1/Stotal of 0.35 or less, 0.30 or less, or 0.25 or less, where Sx1 is the sum of the total peak areas of the components that are eluted at 35° C. to 40° C., and Stotal is the sum of the total peak areas of components that are eluted at 0 to 120° C. In some embodiments, the room temperature soluble fraction of one or more embodiments may have a ratio Sx1/Stotal that ranges from a lower limit of 0 or more, 0.05 or more, or 0.10 or more, to an upper limit of 0.35 or less, 0.30 or less, or 0.25 or less, where any lower limit may be used with any upper limit.

In one or more embodiments, polyethylene-based resin compositions in accordance with the present disclosure may have, according to Cross Fractionation Chromatography (CFC), a fraction eluted at 43° C. to 79° C. that has a weight average molecular weight (Mw) ranging from about 140 kDa to 1750 kDa. In some embodiments the fraction may have a weight average molecular weight ranging from a lower limit of any of 140, 160, 180, or 200 kDa to an upper limit of any of 700, 900, 1100, 1300, 1500, 1700, or 1750 kDa. The fraction eluted at 43° C. to 79° C. of one or more embodiments may also have a ratio Sx2/Stotal of 0.43 or more, 0.50 or more, 0.60 or more, or 0.65 or more, where Sx2 is the sum of the total peak areas of the components that are eluted at 43° C. to 79° C. and Stotal is the sum of the total peak areas of components that are eluted at 0 to 120° C. In some embodiments, the fraction eluted at 43° C. to 79° C. of one or more embodiments may have a ratio Sx2/Stotal that ranges from a lower limit of 0.43 or more, 0.50 or more, 0.60 or more, or 0.65 or more, to an upper limit of 1.0 or less, 0.9 or less, or 0.8 or less, where any lower limit may be used with any upper limit.

In one or more embodiments, polyethylene-based resin compositions in accordance with the present disclosure may have, according to Cross Fractionation Chromatography (CFC), a fraction eluted at 82° C. to 120° C. that has a weight average molecular weight (Mw) ranging from about 1800 kDa to 3600 kDa. In some embodiments the fraction may have a weight average molecular weight ranging from a lower limit of any of 1800, 2000, 2200, 2200, or 2500 kDa to an upper limit of any of 2600, 2800, 3000, 3200, 3400, or 3600 kDa. The fraction eluted at 82° C. to 120° C. may have a ratio Sx3/Stotal that ranges from 0.20 to 0.28, where Sx3 is the sum of the total peak areas of the components that are eluted at 82° C. to 120° C. and Stotal is the sum of the total peak areas of components that are eluted at 0 to 120° C. In some embodiments, the fraction eluted at 82° C. to 120° C. may have a ratio Sx3/Stotal that ranges from a lower limit of 0 or more, 0.10 or more, 0.15 or more, or 0.20 or more, to an upper limit of 0.40 or less, 0.35 or less, 0.30 or less, or 0.28 or less, where any lower limit may be used with any upper limit.

In one or more embodiments, polyethylene-based resin compositions in accordance with the present disclosure may have a substantially constant comonomer composition distribution (CCD) profile across the elution curve in the Temperature Rising Elution Fractionation (TREF) profile, as measured by CFC. It is intended that the term "substantially constant", means a "more or less" constant distribution of short chain branches (CH$_3$) per 1000 total carbons over the crystallization temperature range, i.e. each fraction from TREF have "more or less" the same amount of short chain branches (or CH$_3$) per 1000 total carbons.

In one or more embodiments, polyethylene-based resin compositions in accordance with the present disclosure may have a more constant short-chain branching distribution (SCBD) profile across the molecular weight distribution, as measured by Gel Permeation Chromatography coupled with Fourier transform infrared spectroscopy instruments (GPC-FTIR). The substantially constant distribution of short chain branches per 1000 total carbons (SCB/1000TC) over the molecular weight distribution, may be quantified by a linear regression of the plot of SCB/1000TC vs. log(M) in accordance with equation (1):

$$SCB/1000TC = b\ \log(M) + a \quad (1)$$

where b is the angular coefficient, a is the linear coefficient, and M is the molecular weight. A smaller value of b means a more substantially constant distribution of short chain branches per 1000 total carbons over the molecular weight distribution, i.e. each molecular weight fraction from the low molecular weight end to the high molecular weight end have "more or less" the same amount of short chain branches per 1000 total carbons. In some embodiments, over the log(M) range of 3.5 to 5.5 the value of b may range from a lower limit of any of 0, −1, −3, −5, and −10 to an upper limit of any of 0, 1, 3, 5, and 10 where any lower limit can be used with any mathematically-compatible upper limit. In particular embodiments, the value of b may range from −5 to 5. In other embodiments, the value of b may be approximately 0.

In one or more embodiments, polyethylene-based resin compositions in accordance with the present disclosure may have, according to Crystallization Elution Fractionation (CEF), a room temperature soluble fraction, $F_{sol}$, which is soluble at a temperature below 30° C., that has an A1/Atotal ratio of about 30% or less, 25% or less, or 20% or less, where A1 is the sum of the total peak areas of the components that are eluted below 30° C. and Atotal is the sum of the total peak areas of the components which that eluted at 0 to 140° C. In some embodiments, the room temperature soluble fraction, $F_{sol}$, which is soluble at a temperature below 30° C., has an A1/Atotal ratio that ranges from a lower limit of 0% or more, 5% or more, 10% or more, or 15% or more, to an upper limit of 30% or less, 25% or less, or 20% or less, where any lower limit may be used with any upper limit.

In one or more embodiments, polyethylene-based resin compositions in accordance with the present disclosure may have, according to Crystallization Elution Fractionation (CEF), a fraction eluted at 40° C. to 80° C., that has an A2/Atotal ratio of about 40% or more, 50% or more, or 60% or more, where A2 is the sum of the total peak areas of the components that are eluted at 40° C. to 80° C. and Atotal is the sum of the total peak areas of the components which that eluted at 0 to 140° C. In some embodiments, the fraction eluted at 40° C. to 80° C. has an A2/Atotal ratio that ranges from a lower limit of 40% or more, 50% or more, or 60% or more, to an upper limit of 100% or less, 90% or less, or 80% or less, where any lower limit may be used with any upper limit.

In one or more embodiments, polyethylene-based resin compositions in accordance with the present disclosure may have, according to Crystallization Elution Fractionation (CEF), a fraction eluted at 80° C. to 140° C. that has a ratio A3/Atotal ranging from about 28% to 40%, where A3 is the sum of the total peak areas related to the components which are eluted at 80° C. to 140° C. and Atotal is the sum of the total peak areas of the components which that eluted at 0 to 140° C. In some embodiments, the fraction eluted at 80° C. to 140° C. may have an A3/Atotal ratio that ranges from a lower limit of 20% or more, 25% or more, 28% or more, or 30% or more, to an upper limit of 45% or less, 40% or less, 38% or less or 35% or less, where any lower limit may be used with any upper limit In the CEF of one or more embodiments, a polymer is initially dissolved in an appropriate solvent at an increased temperature, then the temperature of solution is reduced very slowly resulting in gradual crystallization of the polymer. The concentration of the polymer remaining in solution is continuously monitored. The corresponding figure gives the rate of polymer precipitation, dW/dT, as a function of solution temperature T. A CEF curve can be divided into several parts for easier interpretation. According to embodiments of the present disclosure that are described above, the curve was divided into 3 parts:

In one or more embodiments, polyethylene-based resin compositions in accordance with the present disclosure may have, as measured by Gel Permeation Chromatography coupled with Fourier transform infrared spectroscopy (GPC-FTIR), a variation in short-chain branching per 1000 carbons (SCB/1000TC), as of about 30% or less, 25% or less, 20% or less, 15% or less, or 10% or less. GPC-FTIR profiles of LLDPE produced with conventional Ziegler-Natta (ZN) catalysts generally show a clear decrease of SCB per 1000 total carbons, respectively of the comonomer content from low molecular weight to high molecular weight so that a downward profile is given. In contrast, GPC-FTIR profiles of copolymer of ethylene and one or more C4-C8 α-olefins according to one or more embodiments of the invention show a more constant profile. This means that there is a reduced decrease of the SCB per 1000 total carbons from low molecular weight to high molecular weight, quantified in the variation in SCB described above.

In one or more embodiments, polyethylene-based resin compositions in accordance with the present disclosure may have a density, according to ASTM D792, ranging from about 0.900 to 0.950 g/cm³. In particular embodiments, polyethylene-based resin compositions may have a density ranging from a lower limit of any of 0.900, 0.910, 0.920, 0.930 or 0.940 g/cm³ to an upper limit of any of 0.920, 0.930, 0.935, 0.940, 0.945, or 0.950 g/cm³, where any lower limit can be used with any mathematically-compatible upper limit. In some embodiments, the compositions may have a density ranging from about 0.910 to 0.940 g/cm³.

Polyethylene-based resin compositions in accordance with the present disclosure may have a number average molecular weight ($M_n$) ranging from about 5.0 to 60 kDa. In particular embodiments, polyethylene-based resin compositions may have a $M_n$ ranging from a lower limit of any of 5.0, 10.0, 12.0, 15.0, or 20.0 kDa to an upper limit of any of 30, 40, 42, 46, 50, or 60 kDa, where any lower limit can be used with any mathematically-compatible upper limit. In some embodiments, polyethylene-based resin compositions may have a $M_n$ ranging from about 12 to 46 kDa.

Polyethylene-based resin compositions in accordance with the present disclosure may have a weight average molecular weight ($M_w$) ranging from about 50 to 1500 kDa. In particular embodiments, polyethylene-based resin compositions may have a $M_w$ ranging from a lower limit of any of 50, 100, 110, 118, 125, 200, 400, or 600 kDa to an upper limit of any of 500, 800, 1000, 1100, 1200, 1250, 1350, or 1500 kDa, where any lower limit can be used with any mathematically-compatible upper limit. In some embodiments, polyethylene-based resin compositions may have a $M_w$ ranging from about 118 to 1250 kDa.

In one or more embodiments, polyethylene-based resin compositions in accordance with the present disclosure may have a molecular weight distribution (MWD: $M_w/M_n$) ranging from about 1.0 to 50.0. In particular embodiments, polyethylene-based resin compositions may have a molecular weight distribution ranging from a lower limit of any of 1.0, 2.0, 3.0, 4.0, 5.0, 6.0, or 7.0 to an upper limit of any of 8.0, 9.0, 10.0, 12.5, 15.0, 20.0, 30.0, 40.0, or 50.0, where any lower limit can be used with any upper limit. In some embodiments, polyethylene-based resin compositions may have a molecular weight distribution molecular weight distribution ranging from about 3.0 to 10.0.

The aforementioned Mw, Mn, and Mw/Mn values of one or more embodiments may be obtained by gel permeation chromatography (GPC) according to ISO 16014-4:2003 and ASTM D 6474-99. High temperature GPC analyses may be performed using a Viscotek system (from Malvern Instruments) equipped with three columns (PLgel Olexis 300 mm×7 mm I.D. from Agilent Technologies). 200 μL of sample solutions with a concentration of 5 mg mL$^{-1}$ were eluted in 1,2,4-trichlorobenzene using a flow rate of 1 mL min$^{-1}$ at 150° C. The mobile phase may be stabilized with 2,6-di-tert-butyl-4-methylphenol (butylated hydroxytoluene, BHT, 200 mg L$^{-1}$). Online detection may be performed with a differential refractive index detector and a dual light scattering detector (LALS and RALS) for absolute molar mass measurement. The OmniSEC 5.02 software may be used for calculations.

Polyethylene-based resin compositions in accordance with one or more embodiments of the present disclosure may have a monomodal or a multimodal molecular weight distribution. The multimodal compositions in accordance to the present disclosure may comprise a low molecular weight fraction that is a homopolymer of ethylene and a high molecular weight fraction that is a copolymer of ethylene. In another embodiment, the low molecular weight fraction may be a copolymer of ethylene and the high molecular weight fraction may be a homopolymer of ethylene. In particular embodiments, the low molecular weight and high molecular weight fractions may both be copolymers of ethylene. It is understood by those skilled in the art that, although homopolymers in multimodal compositions are substantially free of comonomers, some degree of comonomers may be present in the polymer chains due to their presence as impurities in ethylene streams such as in multi-stage polymerizations processes.

Polyethylene-based resin compositions in accordance with one or more embodiments of the present disclosure may have a crystallinity ($w_c$), measured by DSC, ranging from about 10 to 60%. In some embodiments, polyethylene-based resin compositions may have a crystallinity ranging from a lower limit of any of 10, 15, 20, 25, 30, or 35% to an upper limit of any of 30, 35, 40, 45, 50, or 60%, where any lower limit can be used with any mathematically-compatible upper limit. In particular embodiments, the composition may have a crystallinity ($w_c$) ranging from about 20% to 50%.

Polyethylene-based resin compositions in accordance with one or more embodiments of the present disclosure may have a melting temperature ($T_m$), measured by DSC, ranging from about 100 to 130° C. In some embodiments, polyethylene-based resin compositions may have a melting temperature ranging from a lower limit of any of 100, 105, 110, or 115° C. to an upper limit of any of 115, 120, 125, or 130° C., where any lower limit can be used with any mathematically-compatible upper limit. In particular embodiments, the composition may have a melting temperature ($T_m$) ranging from about 110° C. to 125° C.

Catalyst Systems

The copolymerization of α-olefins is often polymerized using a Ziegler-Natta catalyst system that includes a procatalyst and a cocatalyst. The polyethylene-resin composition of one or more embodiments may be produced by the use of a Ziegler Natta catalyst system that comprises a procatalyst and a cocatalyst. In one or more embodiments, the catalyst system may be substantially free of polar solvents and/or electron donors.

Figure 1B:
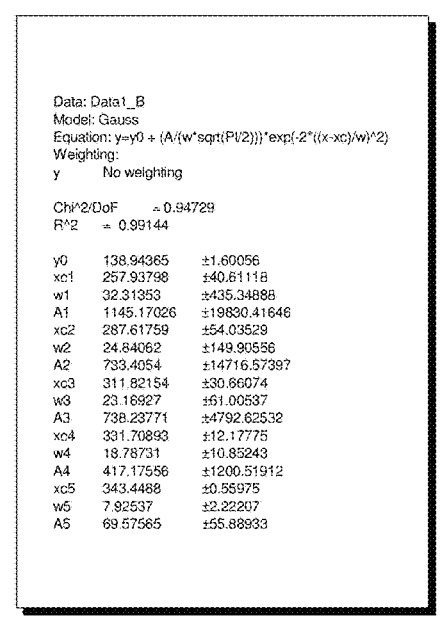

In one or more embodiments, the procatalyst may be a titanium-containing Ziegler Natta procatalyst. The procatalyst of some embodiments may be substantially free of polar solvents and electron donors. In one or more embodiments, the procatalyst may exhibit a UV-Vis spectrum as shown in FIG. 1.

The titanium-containing Ziegler-Natta procatalyst of one or more embodiments may contain titanium in an amount ranging from about 0.5 to 3.0 wt. %, relative to the weight of the procatalyst. In some embodiments, procatalysts may contain an amount of titanium ranging from a lower limit of any of 0.5, 1.0, 1.5, and 2.0 wt. % to an upper limit of any of 2.0, 2.5, 3.0, 4.0, and 6.0 wt. %, where any lower limit can be used with any mathematically-compatible upper limit.

The procatalyst of one or more embodiments may further comprise, in addition to titanium, magnesium and chlorine. In some embodiments, the titanium, magnesium, and chlorine may all be active components of the procatalyst. In some embodiments, a catalytically active portion of the procatalyst comprises titanium, magnesium, chlorine, one or more alkoxy group-containing compounds, and at least one group 13 organometallic compound.

In some embodiments, the procatalyst may comprise magnesium in an amount ranging from about 0.3 to 5% by weight. In one or more embodiments, procatalysts may contain an amount of magnesium ranging from a lower limit of any of 0.3, 0.5, 0.8, 1.0, 1.5, 2.0, and 2.5 wt. % to an upper limit of any of 2.0, 2.5, 3.0, 4.0, and 5.0 wt. %, where any lower limit can be used with any mathematically-compatible upper limit. In particular embodiments, the procatalyst may comprise magnesium in an amount ranging from about 0.3 to 3% by weight.

In some embodiments, the procatalyst may comprise chlorine in an amount ranging from about 0.3 to 5% by weight. In particular embodiments, procatalysts may contain an amount of chlorine ranging from a lower limit of any of 0.3, 0.5, 0.8, 1.0, 1.5, 2.0, and 2.5 wt. % to an upper limit of any of 2.0, 2.5, 3.0, 4.0, and 5.0 wt. %, where any lower limit can be used with any mathematically-compatible upper limit.

The procatalyst of one or more embodiments may further comprise, in addition to titanium, chlorine, one or more alkoxy group-containing compounds, and a Group 13 organometallic compound. In some embodiments, the procatalyst may contain the chlorine, alkoxy-group containing compounds, and organometallic compound in a total amount ranging from about 0.3 to 5% by weight. In particular embodiments, procatalysts may contain the components in a total amount ranging from a lower limit of any of 0.3, 0.5, 0.8, 1.0, 1.5, 2.0, and 2.5 wt. % to an upper limit of any of 2.0, 2.5, 3.0, 4.0, and 5.0 wt. %, where any lower limit can be used with any mathematically-compatible upper limit.

The procatalyst of one or more embodiments may be supported. In some embodiments, the procatalyst may be supported on an activated particulate silica carrier. In some embodiments, the procatalyst comprises a particulate silica carrier in an amount of 65 to 85 wt. %, relative to the weight of the procatalyst. In some embodiments, procatalysts may contain the silica carrier in an amount ranging from a lower limit of any of 65, 67.5, 70.0, 72.5, and 75.0 wt. % to an upper limit of any of 75.0, 77.5, 80.0, 82.5, and 85 wt. %, where any lower limit can be used with any mathematically-compatible upper limit.

In some embodiments, the procatalyst comprises a catalytically active portion in an amount of 15 to 35 wt. %, relative to the weight of the procatalyst. In some embodiments, procatalysts may contain the catalytically active portion in an amount ranging from a lower limit of any of 15, 17.5, 20.0, 22.5, and 25 wt. % to an upper limit of any of 25, 27.5, 30.0, 32.5, and 35 wt. %, where any lower limit can be used with any mathematically-compatible upper limit.

The Ti-containing Ziegler-Natta procatalyst of one or more embodiments may be prepared by a process comprising:
(a) impregnating an activated particulate silica using a solution of a group 13 organometallic compound in an amount ranging from 0.1 to 1 mmole of the organometallic solution per mmole of OH on the silica surface, in an inert organic solvent;
(b) removing the supernatant liquid from the step (a);
(c) preparing a solution obtained by reacting at least one magnesium compound, selected from magnesium halides and magnesium alkoxides, in an amount ranging from 0.0024 to 0.24 g of magnesium per g of silica, and at least one titanium compound, selected from titanium alkoxides and titanium halogen alkoxides, in an amount ranging from 0.01 to 1 g of titanium per g of silica;
(d) impregnating the silica obtained in (b) using the solution prepared in (c);
(e) optionally reacting the solid obtained in (d) with a reducing agent selected from the group consisting of Na alkyls, Li-alkyls, Zn-alkyls, Mg-alkyls and corresponding aryl-derivatives, Grignard compounds of the type RMgX and polyhydrosiloxanes, wherein R represents a linear or branched alkyl group, containing from 1 to 10 carbons or aryl-derivatives and X represents a halogen atom, and Al-alkyl halide or silicon compounds;
(f) reacting the solid obtained in (d) or (e) with a halogenating agent selected from the group consisting of methylaluminum dichloride, methylaluminum sesquichloride, isobutylaluminum dichloride, isobutylaluminum sesquichloride, ethylaluminum dichloride (EADC), diethylaluminum chloride (DEAC), ethylaluminum sesquichloride (EASC), $SiCl_4$, $SnCl_4$, HCl, $Cl_2$, $HSiCl_3$, aluminium chloride, ethylboron dichloride, boron chloride, diethylboron chloride, $HCCl_3$, $PCl_3$, $POCl_3$, acetyl chlorides, thionyl chloride, sulfur chloride, methyl trichlorosilane, dimethyl dichlorosilane, $TiCl_4$, $VCl4$, $CCl_4$, t-butylchloride, n-butyl chloride, chloroform, 1,1,1-trichloroethane, 1,1,2-trichloroethane, 1,2-dichloroethane and dichloromethane;
(g) maintaining the solid obtained in (f) at a temperature from 60° C. to 120° C. from 0.5 hour to 5 hours;
(h) washing the solid obtained in (g) with an inert organic solvent;
(i) optionally washing the solid obtained in (h) with a solution of one or more organometallic compounds of group 13 of the periodic table in an amount ranging from 0 to 3 g of the organometallic compound per g of the dry procatalyst component obtained.

The cocatalyst of one or more embodiments may comprise one or more alkylaluminum cocatalyst. In some embodiments, the alkylaluminum may be a trialkylaluminum. In particular embodiments, the trialkylaluminum may be one or more selected from the group consisting of trimethylaluminum, triethylaluminum, and triisobutylaluminum.

The catalyst system may contain the procatalyst and the alkylaluminum cocatalyst in amounts such that a molar ratio of Al/Ti ranges from about 0.5 to about 100.0. In some embodiments, the catalyst systems may have a molar ratio of Al/Ti ranging from a lower limit of any of 0.5, 1, 3, 5, 7, 9, and 10 to an upper limit of any of 15, 20, 22, 24, 26, 30, 35, 40, 45, 50, 75 and 100 where any lower limit can be used with any mathematically-compatible upper limit. In particular embodiments, the molar ratio of Al/Ti may range from 3 to 24.

In one or more embodiments, polyethylene-based resin compositions in accordance with the present disclosure may be prepared using a co-catalyst in addition to a catalyst. In one or more embodiments, the co-catalyst may be triethyl aluminum.

Methods of Preparing Compositions

Polyethylene-based resin compositions in accordance with the present disclosure may be prepared by any suitable method known in the art. In one or more embodiments, the method of preparing the polyethylene-based resin composition may be any suitable polymerization process known to one of ordinary skill in the art.

The copolymerization of one or more embodiments may be a liquid-phase polymerization such as solution polymerization, suspension polymerization, or the like, or a gas-phase polymerization. In particular embodiments, polyethylene-based resin compositions may be produced by a gas-phase polymerization.

The copolymerization may be performed in a one-stage or a multistage process. In some embodiments, the copolymerization may be a multistage process that comprises a plurality of reactors in series. In such a multi-stage polymerization process, the reactors are preferably connected in series such that the products of one reactor are used as the starting material in the next reactor. The polymerization reactions used in each stage may involve conventional ethylene homo-polymerization or copolymerization reactions, e.g. gas phase, slurry phase, liquid phase polymerizations, using conventional reactors, e.g. loop reactors, gas phase reactors, batch reactors, etc. In some embodiments, each stage may involve a gas-phase polymerization reactor. The polymerization may be carried out continuously or batch wise. In particular embodiments, the polymerization may be carried out continuously. In some embodiments, production of a composition may include a first reactor where only ethylene is polymerized and a subsequent reactor where ethylene and one or more comonomers are polymerized.

The composition comprising a copolymer of ethylene and one or more C4-C8 α-olefins, having 4 to 8 carbon atoms according to the invention may be prepared, as already stated above, by copolymerizing ethylene and one or more C4-C8 α-olefins comonomers in the presence of a catalyst system. The catalyst system of one or more embodiments may be one of the aforementioned catalyst systems that comprise one or more of the aforementioned Ziegler-Natta procatalysts and cocatalysts.

In some embodiments, the catalyst system may be introduced at the beginning of the polymerization of ethylene, with or without one or more comonomers, and is transferred with the resulting polyethylene-based polymer to a second reactor where it serves to catalyze the copolymerization of ethylene and one or more comonomers to produce the copolymer.

In one or more embodiments, where the copolymerization uses one or more gas-phase reactors, the gas-phase of one of the one or more reactors may contain one of the one or more C4-C8 α-olefins in an amount ranging from about 15 to 40% by volume. In one or more embodiments, the gas-phase of one or more reactors further comprises hydrogen.

As would be apparent to one of ordinary skill in the art with the benefit of the present disclosure, polyethylene-based resin compositions in accordance with the present disclosure may be prepared by any suitable method, not only those described above.

Articles

As will be apparent to one of ordinary skill in the art having the benefit of the present disclosure, articles may be formed from any of the above-mentioned polyethylene-based resin compositions. The articles may be produced by any means that are conventionally known in the art.

EXAMPLES

The following examples are merely illustrative and should not be interpreted as limiting the scope of the present disclosure.

Methods

Molecular Weight Distribution (MWD) and Short Chain Branching (SCB): Molecular weight distribution (MWD) were determined by Gel Permeation Chromatography (GPC) according to ISO 1601 4-4:2003 and ASTM D 6474-99. A Waters GPC2000 instrument, equipped with heated flow cell (at 140° C.) connected via a heated transfer line (at 140° C.) was used with 2× Olexis and 1× Olexis Guard columns from Polymer Laboratories and 1,2,4-trichlorobenzene (TCB) as solvent at 140° C. and at a constant flow rate of 1 mL/min. The heated flow cell is mounted on a sample plate located in a Perkin Elmer Spectrum 100 equipped with a mercury cadmium telluride (MCT) detector. The MCT detector is cooled with liquid nitrogen. During the chromatographic run a series of FTIR spectra is collected using the Perkin Elmer TimeBase V3.0 Software. The spectrometer settings were 16 accumulations, scan range from 3000 cm to 2700 cm, resolution 8 cm−1. A background spectrum taken under GPC run conditions is subtracted from each spectrum collected during the chromatographic run. 423.5 LL of Sample solution were injected per analysis. The column set was calibrated using universal calibration (according to ISO 16014-2:2003) with at least 15 narrow MWD polystyrene (PS) standards in the range of 0.6 kg/mol to 6000 kg/mol. Mark Houwink constants for PS, PE and PP used are as per ASTM D 6474-99. All samples were prepared by dissolving 4.0-8.0 mg of polymer in 4 mL (at 140° C.) of stabilized TCB (stabilized with 250 mg/L of butylated hydroxytoluene—BHT) and keeping for max 3 hours at max 160° C. with continuously gentle shaking prior sampling into the GPC instrument. The spectral data as recorded by Perkin Elmer TimeBase 3.0 software is imported into Polymer Laboratories Cirrus V3.1 software and the evaluation towards molecular weights and molecular weight distribution was performed with this software.

The composition of copolymers was determined by $^{13}C$ NMR. Polymers were dissolved in a mixture of benzene-$d_6$/tetrachloroethylene ($C_6D_6$/TCE, ½ v/v) under heating with concentration 75 mg mL$^{-1}$ in a 10 mm tube. The spectra were recorded with a Bruker AVANCE II spectrometer operating at 100.6 MHz for $^{13}C$ ($^1H$ 400 MHz) at 90° C. $^1H$ spectra were recorded under the following operating conditions: zg30 sequence, acquisition time 4.09 s, relaxation delay 3 s, 400 scans. $^{13}C$ spectra were recorded under the following operating conditions: zgig70 sequence (without nuclear Overhauser effect), acquisition time 1.36 s, relaxation delay 10 s, 2000 scans. Residual carbon $S_{\delta+\delta}$ (δ 29.58 ppm) of polyethylene were used as internal reference for $^{13}C$ NMR spectra, respectively. $^{13}C$ NMR comonomer content and distributions were determined according by the methodology proposed by J. C. Randall et al., in "NMR and Macromolecules" ACS Symposium series 247 and J. C. Randall in "Polymer Sequence Determination", academic Press, New York (1977) provide general methods of polymer analysis by NMR spectroscopy.

DSC analyses were performed with Mettler Toledo DSC 1 system equipped with an auto-sampler and a 120 thermocouple sensor. The temperature and the heat flow of the equipment were calibrated with an indium standard. All samples were accurately weighed (6±0.1 mg) and sealed in aluminum pans. An empty aluminum pan was employed as the reference. Dry nitrogen with a flow rate set at 50 mL min$^{-1}$ was used as the purging gas. The STARe thermal analysis software was used to process the collected data. Melting peak temperature ($T_m$) was defined as the temperature corresponding to the melting peak point; the crystallinity (by weight, $w_c$) of the samples was calculated through $w_c = \Delta H_f / \Delta H_{f0}$, where $\Delta H_f$ (J g$^{-1}$) is the melting enthalpy of the sample and $\Delta H_{f0}$ (293 J g$^{-1}$) is the melting enthalpy of a 100% crystalline polyethylene. Conventional DSC method: Samples were heated to 180° C. to erase thermal history and then cooled to −20° C. before being heated to 180° C. Heating rate 10° C. min$^{-1}$, cooling rate −10° C. min$^{-1}$.

Successive self-nucleation/annealing SSA-DSC measurements were performed by employing two different protocols:

Thermal protocol #1: Samples were heated to 170° C. and held for 5 min to erase the thermal history. The samples were then cooled to 50° C. for crystallization until saturation. The ideal self-nucleation temperature (Ts, ideal) 125° C. was determined through self-nucleation (SN) experiments. The interval between neighboring isothermal crystallization temperatures was 5° C., which generated 15 stages until 55° C. Each isothermal crystallization step lasted for 5 min. The samples were cooled to 50° C. between each two neighboring isothermal crystallization steps. After the last isothermal crystallization step, the samples were cooled to −20° C. and then heated to 170° C. for the measurement scan. For the whole procedure, heating rate 10° C. min−1, cooling rate −10° C. min−1. Thermal protocol #2: This is a modified version of protocol #1, made in order to enhance the resolution of SSA-DSC results. The difference from #1 is that the lowest isothermal crystallization temperature was 115° C., which generated 6 stages with intervals of 2° C. The other parameters were kept the same.

Crystallization Elution Fractionation (CEF) Characterization was performed using a high throughput equipment to analyze the Chemical Composition Distribution in polyolefins, using a new approach which combines CRYSTAF and TREF separation mechanisms. CEF determines the comonomer composition distribution (CCD) which refers to the distribution of comonomer between copolymer molecules and the distribution of comonomer within each polymer molecule. CEF curves were collected with a Polymer Char A-CEF setup, equipped with an IRS detector and a dual capillary viscometer detector in line. Polymer solutions in DCB, added with 0.40 mg mL$^{-1}$ of BHT, were prepared by dissolving a pre-weighed polymer amount in a volume of DCB/BHT so as to achieve a concentration of 2.0 mg mL$^{-1}$. After 90 min at 150° C. under vortexing to ensure complete dissolution, the samples were robotically charged into the injection loop, and after 5 min at 95° C. moved into the column. The crystallization step consisted of a 2.0° C. min$^{-1}$ temperature ramp under an eluent flow of 0.060 mL min$^{-1}$ down to 30° C. After 1 min at the latter temperature, the samples were finally eluted by heating them at 4.0° C. min$^{-1}$ and a flow rate 1.0 mL min$^{-1}$ up to 140° C. IR and viscometer calibrations were carried out with one homopolyethylene and six ethene/1-octene copolymer standards provided by Polymer Char.

Cross Fractionation Chromatography (CFC) Characterization combines Temperature Rising Elution Fractionation (TREF) and GPC to provide highly detailed 3-D bivariate distribution analysis. This correlates molecular weight distribution (MWD) and chemical composition distribution (CCD). TREF×GPC cross fractionation was performed using a cross-fractionation chromatography (CFC) provided by Polymer Char (Spain).[1] 1,2-Dichlorobenzene (o-DCB), with 0.1 ppm of antioxidant butylated hydroxytoluene (BHT), was used as solvent for sample dissolution and analysis. For each run, 0.5 mL of polymer solution (3.5-3.6 mg mL$^{-1}$) was loaded into the TREF column. During the crystallization step, a cooling rate of 0.5° C. min$^{-1}$ was used. During the elution step, the temperature was increased from 30 to 140° C. with a stepwise temperature increase of 3° C. As for the detector Infrared Detector IR5 MCT was used. The elution temperature range of 30° C. to 140° C. was divided into 20 to 25 fractions. For GPC analysis, a flow rate of 1 mL min$^{-1}$ and 3 PLGel 10 micron mixed columns (Polymer Laboratories Inc.) were used. Narrow polystyrene standards were employed to calibrate GPC measurement. Although it is said that the CFC is an analytical method capable of reproducing the results with high precision when the measurement conditions are strictly the same, the measurement is preferably carried out several times and the results are averaged.

Thermal Gradient Interaction Chromatography (TGIC) characterization was performed on a Polymer Char TGIC instrument using a Hypercarb column and two detectors: IR5 and Viscometer. Samples were injected at a concentration of 0.5 mg mL$^{-1}$ in a volume of 200 μL at 150° C. Cooling stage ends at 40° C. at a rate of −5° C. min$^{-1}$ without flow. Heating stage ends at 160° C. at a rate of 2° C. min$^{-1}$ with a flow rate of 0.5 mL min$^{-1}$.

Solvent gradient interaction chromatography (SGIC) was conducted on a high temperature SGIC instrument (PolymerChar) using a Hypercarb column and an ELS-detector (1.5 L/min nitrogen, nebulization 160° C., evaporation 260° C.). The flow rate of the mobile phase was 0.8 mL/min. The volume of the sample loop was 200 μL. Samples were injected at a concentration of 1.5-2.2 mg mL$^{-1}$. Solvent gradient: 0-3 min=100% 1-decanol, 3-13 min=linear gradient from 1-decanol to TCB, 13-15 min=100% TCB, 15-17 min=linear gradient from TCB to 1-decanol, 17-45 min=100% 1-decanol.

Preparation of Procatalyst A

In a 5 liter flask fitted with a mechanical stirrer and previously purged with nitrogen were fed 24 g (0.252 moles) of anhydrous MgCl$_2$ and 180 ml (0.528 moles) of titanium tetra-n-butylate (Ti(OBu)$_4$). This mixture was allowed to stir at 300 rpm and heated to 150° C. for about 12 hours in order to have the solids completely dissolved, thereby a clear liquid product was obtained. This resulting liquid was cooled down to 40° C. and under gently stirring at 150 rpm, it was diluted with 3200 ml of anhydrous hexane. Into this solution kept at 40° C. and under the same stirring, 300 g of the silica support were added. This silica was previously dehydrated and treated with 23 ml (0.167 moles) of triethylaluminum (TEAL) diluted in anhydrous hexane, for 50 minutes and at room temperature. Once the addition of the silica is completed, the mixture was heated to 60° C. and kept at this temperature for 1 hour. To this mixture a solution of 100 ml of anhydrous hexane and 100 ml of SiCl$_4$ (0.873 moles) was dropped over a period of time of 1 hour. At the end of the addition, stirring was continued for 3.5 hours at a temperature of 60° C. The temperature of the mixture was then brought to 65° C. and kept for additional 2 hours. After cooling the mixture to room temperature, the stirring was stopped to have the solid settled. The supernatant liquid was removed, the solid was repeatedly washed with anhydrous hexane. The solid thus obtained was again suspended in 2200 ml of anhydrous hexane and then 30 g of diethylaluminum chloride (DEAC) (0.249 moles) in 200 ml of anhydrous hexane were added to the resulting suspension under gently stirring. Contact was maintained for 50 min at room temperature. Finally, the supernatant liquid was removed and the solid was dried at 60° C. under nitrogen flow thus giving 350 g of a brown-reddish powder. The chemical and physical characteristics of the resulting reddish powder were as follows:

Total Titanium=2.0% (by weight)
Mg=1.5% (by weight)
SiO$_2$=76.8% (by weight)
Al=1.7% (by weight)
Cl=10.3% (by weight)
OBu=6.7% (by weight)

Figure 2:
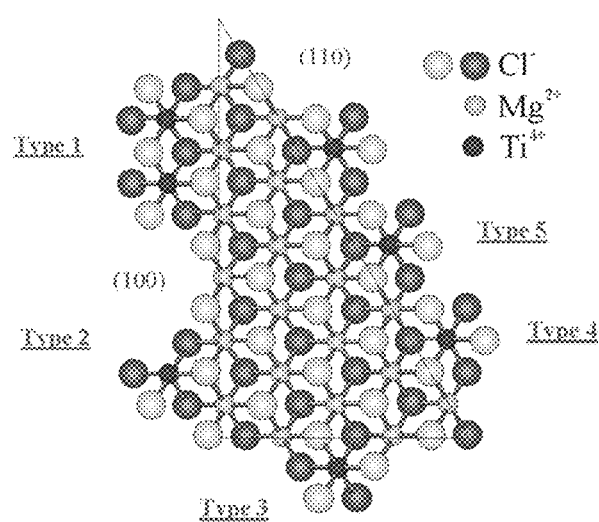
FIG. 2 depicts a model of how $TiCl_4$ and $MgCl_2$ coordinate in one or more embodiments.

The procatalyst A was also characterized by X-ray photoelectron (XPS) and UV-Vis spectroscopies. For XPS data see FIGS. 12 and 13. For UV-Vis spectroscopy, see FIGS. 1 and 14. It is verified, from FIG. 14 that procatalyst A shows two main categories with different chemical species in the composition. According to the literature, when the titanium and magnesium compounds are deposited over the catalytic support (silica) there is a precipitation of both compounds and the titanium compound is immobilized on the crystal faces (100) and (110) of MgCl$_2$. The crystal structure of MgCl$_2$ is isotype to that of y-TiCl$_3$ and therefore it offers the equivalent coordination site for immobilizing titanium alkyl halide complexes at the MgCl$_2$ surface. The importance of the similarities in the structures and ionic radii of MgCl$_2$ and TiCl$_3$ or TiCl$_4$ was pointed out by Kashiwa (Kashiwa, N., *Polym. J.*, 12 (1980) 603) and Galli et al (Galli, P., Luciani L. and Cecchin, G., *Angew. Makromol. Chem.*, 94 (1981) 63). As pointed out by Corradini et al. (Corradini, P.; Barone, V.; Fusco, R.; Guerra, G. *Gazz. Chim. Ital.* 113 (1983) 601), the model of catalytic centers was resulted from the coordination of TiCl$_4$ units, subsequently reduced to TiCl$_3$ and alkylated by alkylaluminum, to lateral unsaturated (100) and (110) faces of MgCl$_2$ crystals, as can be seen in FIG. 2.

Preparation of Comparative Procatalyst B

Procatalyst Comparative B was prepared according to example 9 of Braskem U.S. Pat. No. 9,873,750B2. To a 300 mL Schlenk flask equipped with a sealed mechanical stirrer under N$_2$ atmosphere, 100 ml of TiCl$_4$ was added and the temperature was cooled down to 0° C. Then, 5.7 g of MgCl$_2$-EtOH adduct was added and the mixture was stirred at 350 RPM followed by the dropwise addition of 22 ml of diisobutyl phthalate in hexane 10% (by weight). The temperature of the reactive mixture was increased to 100° C. and stirred for 1 hour. The unreacted TiCl$_4$ and its residues were removed by filtration followed by an additional 100 ml of TiCl$_4$ to remove undesired remain residues. Thus, the resulting suspension was stirred for 1 hour at 120° C. and filtered again. The solid procatalyst was washed several times with anhydride hexane at 60° C. and dried under N$_2$ to obtain the final procatalyst. The chemical and physical characteristics of the resulting reddish powder were as follows:

Total Titanium=5.6% (by weight)

Copolymerization of Ethylene and 1-Butene

Examples 1-14

Examples 1 to 14 refer to examples of copolymer of ethylene with butene-1 prepared in a bench scale gas phase reactor, in different conditions, with Procatalyst A. The curved agitator was able to vigorously stir the procatalyst/polymer particles along with dispersant (thermally treated NaCl grain) to achieve sufficient contact with gas phase. After the reactor was conditioned at 85° C. under vacuum for two hours, the reactor was cooled down to room temperature and filled up with inert gas. A pre-determined amount of neat triethylalumninum (TEAL) was injected. Then the reactor was heated up again. After the temperature in the reactor was stabilized at 85° C., 200 mg procatalyst (mixed with 20 g salt in glovebox and transferred into cartridge) was flushed down to the reactor by pressurized monomer from monomer reservoir. Immediately the target pressure of monomer was reached and maintained constant (±0.02 bar). As long as polymerization reaction occurred in the reactor, pressure of the reservoir dropped and was recorded by both computer and manual reading. At the end of reaction, the reactor was depressurized and cooled. Product was retrieved and washed by water and then dried under vacuum at 70° C.

Examples 15-20

Examples 15 to 20 refer to examples of copolymer of ethylene with butene-1 prepared in a bench scale gas phase reactor, in different conditions, with Procatalyst A. The curved agitator was able to vigorously stir the procatalyst/polymer particles along with dispersant (thermally treated NaCl grain) to achieve sufficient contact with gas phase. After the reactor was conditioned at 85° C. under vacuum for two hours, the reactor was cooled down to room temperature and filled up with inert gas. A pre-determined amount of neat triisobutylaluminum (TIBA) was injected. Then the reactor was heated up again. After the temperature in the reactor was stabilized at 85° C., 200 mg procatalyst (mixed with 20 g salt in glovebox and transferred into cartridge) was flushed down to the reactor by pressurized monomer from monomer reservoir. Immediately the target pressure of monomer was reached and maintained constant (±0.02 bar). As long as polymerization reaction occurred in the reactor, pressure of the reservoir dropped and was recorded by both computer and manual reading. At the end of reaction, the reactor was depressurized and cooled. Product was retrieved and washed by water and then dried under vacuum at 70° C.

Comparative Examples 1-7

Comparative Examples 1 to 7 refer to examples of copolymer of ethylene with butene-1 prepared in a bench scale gas phase reactor, in different conditions, with Comparative Procatalyst B. The curved agitator was able to vigorously stir the procatalyst/polymer particles along with dispersant (thermally treated NaCl grain) to achieve sufficient contact with gas phase. After the reactor was conditioned at 85° C. under vacuum for two hours, the reactor was cooled down to room temperature and filled up with inert gas. A pre-determined amount of neat TEAL was injected. Then the reactor was heated up again. After the temperature in the reactor was stabilized at 85° C., 200 mg procatalyst (mixed with 20 g salt in glovebox and transferred into cartridge) was flushed down to the reactor by pressurized monomer from monomer reservoir. Immediately the target pressure of monomer was reached and maintained constant (±0.02 bar). As long as polymerization reaction occurred in the reactor, pressure of the reservoir dropped and was recorded by both computer and manual reading. At the end of reaction, the reactor was depressurized and cooled. Product was retrieved and washed by water and then dried under vacuum at 70° C.

Polymerization Results and Polymer Analysis

FIG. 15 shows the copolymer of ethylene with butene-1 results prepared with the procatalyst A, as described under point PREPARATION OF PROCATALYST A with TEAL or TIBA as co-catalyst, at two different gas compositions (20% and 33% C4 in C2/C4 mixture). Measurements of copolymer properties such as butene-1 content by $^{13}$C NMR spectroscopy, melting peak temperature ($T_m$) and crystallinity ($w_c$) by DSC, molecular weight averages ($M_w$, $M_n$) and molecular weight distribution (MWD) by conventional GPC, are also displayed in the FIG. 14.

Figure 3:
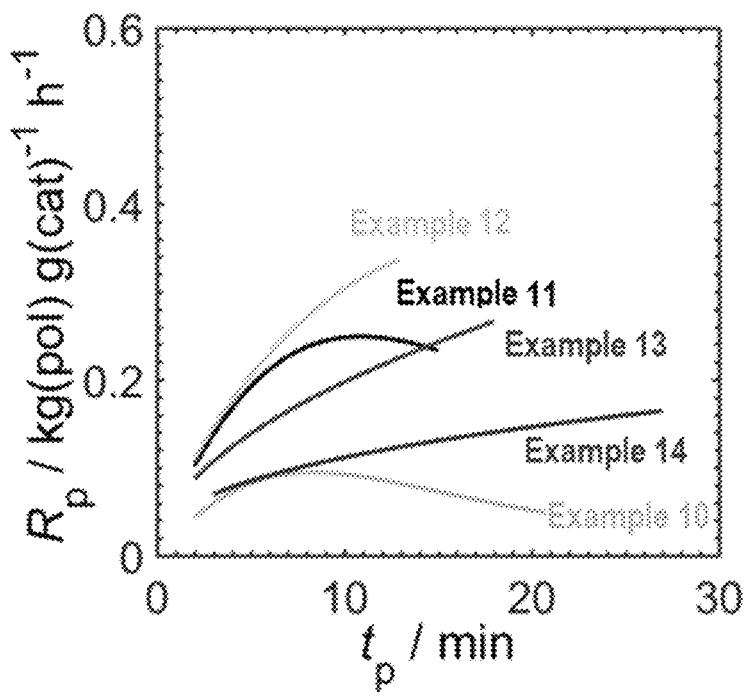
FIG. 3 depicts a graph displaying the effect of the Al/Ti molar ratio on the kinetics of procatalyst A of one or more embodiments

The kinetic curves for procatalyst A activated by TEAL at different Al/Ti ratios can be seen in FIG. 3. The catalytic system employed in this study requires a minimum amount of alkylaluminum to be fully activated (Al/Ti between 6 and 12, examples 11 and 12 from FIG. 3). It suggests that a function of alkylaluminum is to form active species by alkylation. The kinetics showed early decay at low level of TEAL, displaying the role of TEAL as the scavenger. On the other hand, a high dosage of alkylaluminum resulted in decreased activity with a prolonged "induction" period during which the activity kept increasing.

Figure 4A:
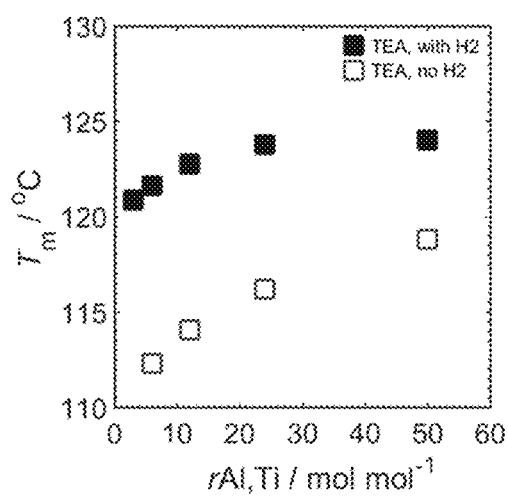
FIGS. 4A-B depict graphs indicating the $H_2$ and Al/Ti effects on melting peak temperature ($T_m$) and crystallinity ($w_c$), measured by differential scanning calorimetry (DSC), of the copolymer obtained with procatalyst A of one or more embodiments.
Figure 4B:
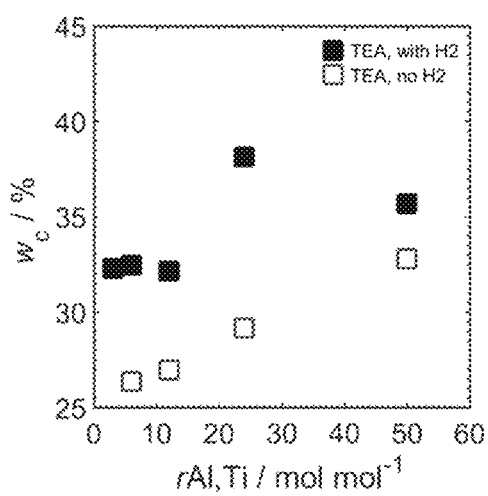
Figure 5A:
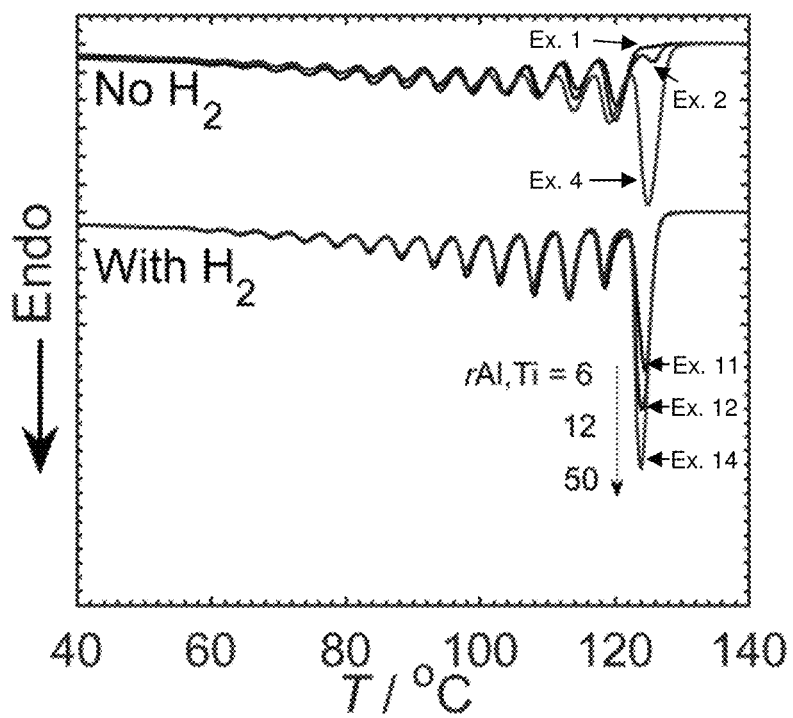
FIGS. 5A-B are a successive self-nucleation/annealing SSA-DSC profiles of the copolymer of ethylene and one or more C4-C8 α-olefins obtained with procatalyst A of one or more embodiments, demonstrating the effects of $H_2$ and Al/Ti ratio on the copolymer obtained.
Figure 5B:
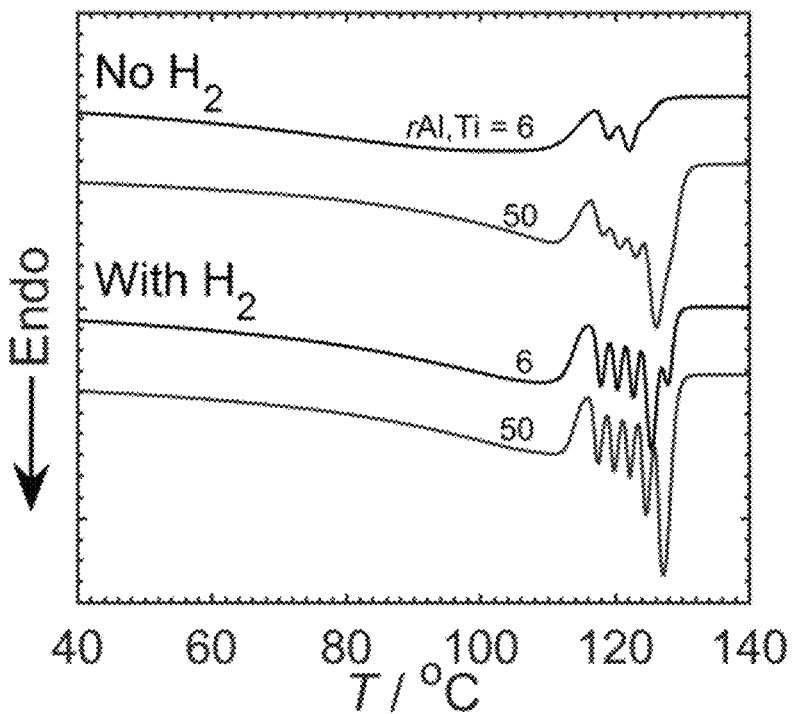

It was found that the melting peak temperature, $T_m$, of the copolymer of ethylene with butene-1 prepared with procatalyst A increased over Al/Ti and was independent of the C4 incorporation, as can be seen from the results presented in FIG. 15. FIG. 4 also demonstrates the effect of variation of Al/Ti on $T_m$ and $w_c$ of copolymers with approximately same incorporated butene-1 content. To better understand the influence of alkylaluminum on the short chain branching distribution (SCBD) on the copolymer main chains, thermal fractionation through successive self-nucleation/annealing differential scanning calorimetry (SSA-DSC) was carried out for selected samples. The results of thermal fractionation at $\Delta T_s = 5°$ C. in FIG. 5 (left) showed that higher Al/Ti resulted in higher content of the fraction of the highest melting temperature. Meanwhile the parts of lower melting temperature were very similar. Fractionation of the portion of the highest $T_m$ at higher resolution ($\Delta T_s = 2°$ C.) in FIG. 5 (right) revealed that it was contributed by the increased share of the thickest lamellae. Overall the SSA-DSC characterization demonstrated that the variable Al/Ti affected the melting behaviors of C2/C4 copolymer, by changing the crystalline and amorphous fractions portions, through modulating the contribution of the thickest lamellae which is correlated to the length of successive methylene sequence.

FIG. 16 shows the CEF data of copolymers of ethylene with butene-1 prepared with the procatalyst A activated with TEAL, at various Al/Ti ratio. Although C4 incorporation was insignificantly affected, the CCD has shown clear difference. The increase of Al/Ti resulted in both increased soluble fraction and increased crystalline fraction of the higher elution temperature at cost of decreased fraction of medium elution temperature. It was also found that the absence of $H_2$ intensified the influence of Al/Ti on CCD. The move of the fraction of the higher elution temperature towards higher T over Al/Ti became more significant in the absence of $H_2$. FIG. 17 shows the comparison of CEF data of copolymers of ethylene with butene-1 prepared with the procatalyst A, activated with TEA (Example 7) and with the procatalyst Comparative B (Example Comparative 4). For these samples, the CEF curve was divided into 3 parts, for easier interpretation: A1 (Room Temperature soluble fraction, $F_{sol}$: the polymer that is soluble at room temperature—below 30° C.), A2 (fraction eluted at 40° C. to 80° C.) and A3 (HD-fraction eluted at 82° C. to 120° C.). In this way, it can be verified that the CEF profile that has a more homogeneous CCD profile across the crystallization temperature is Example 7 lower amount of A1 and A3 and has higher amount of the fraction A2.

Figure 6A:
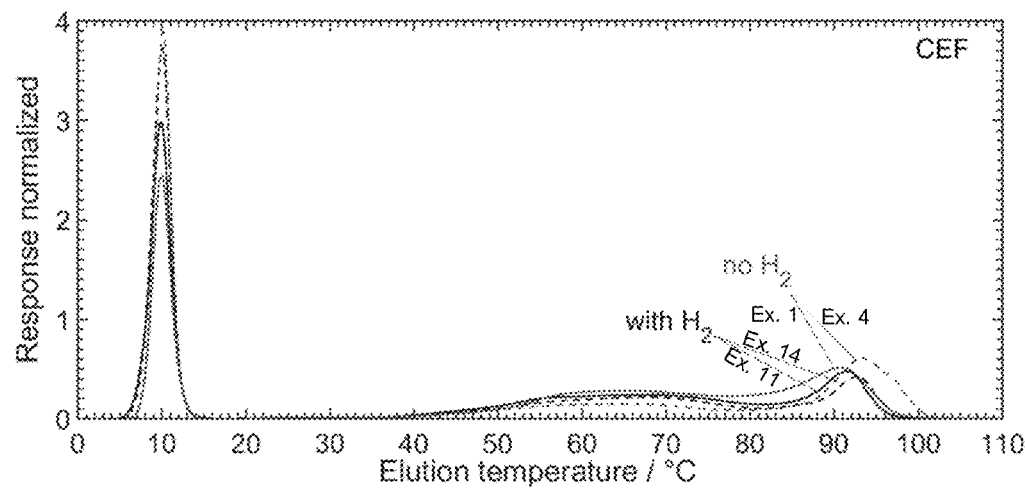
FIGS. 6A-E are a crystallization elution fractionation (CEF) profile, a thermal gradient interaction chromatography (TGIC) profile, a solvent gradient interaction chromatography (SGIC) profile, and a gel permeation chromatography (GPC) profile, respectively, of copolymers according to one or more embodiments of the present disclosure.
Figure 6B:
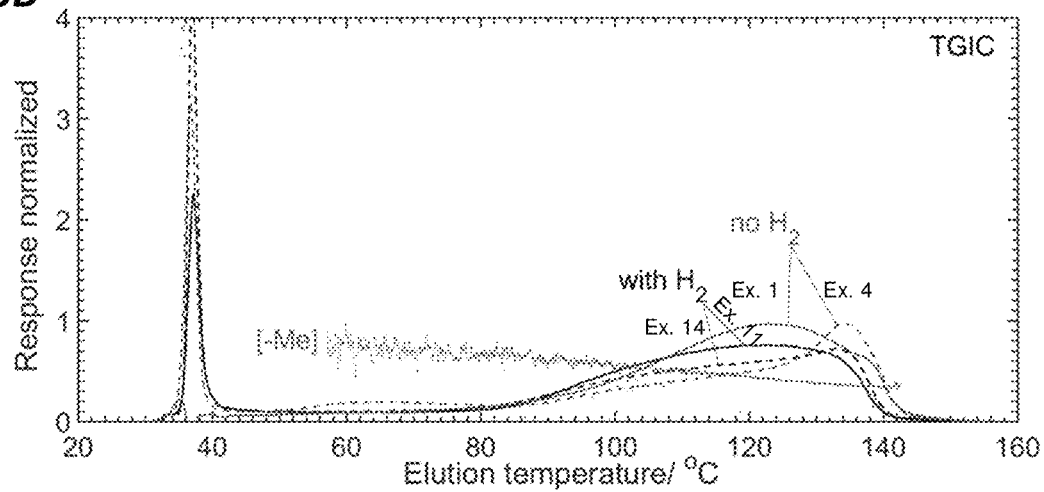
Figure 6C:
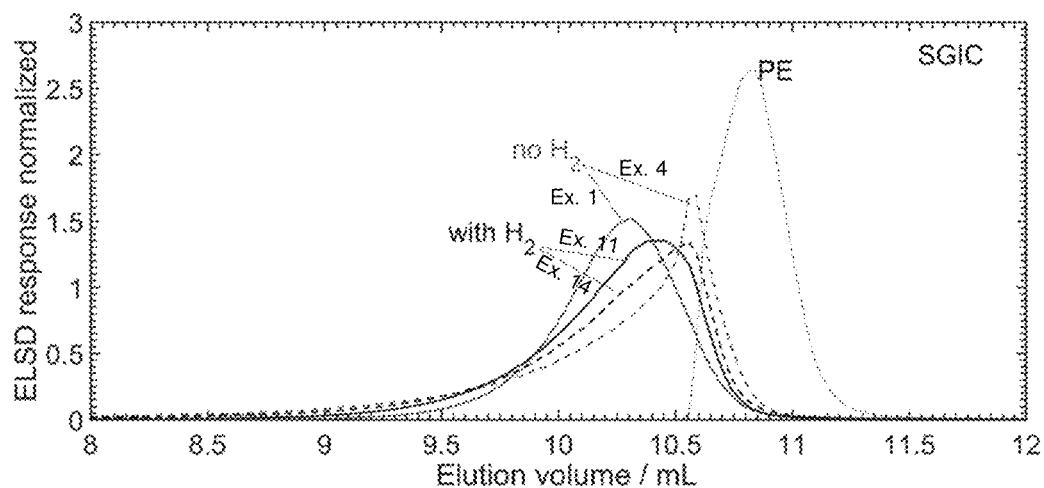
Figure 6D:
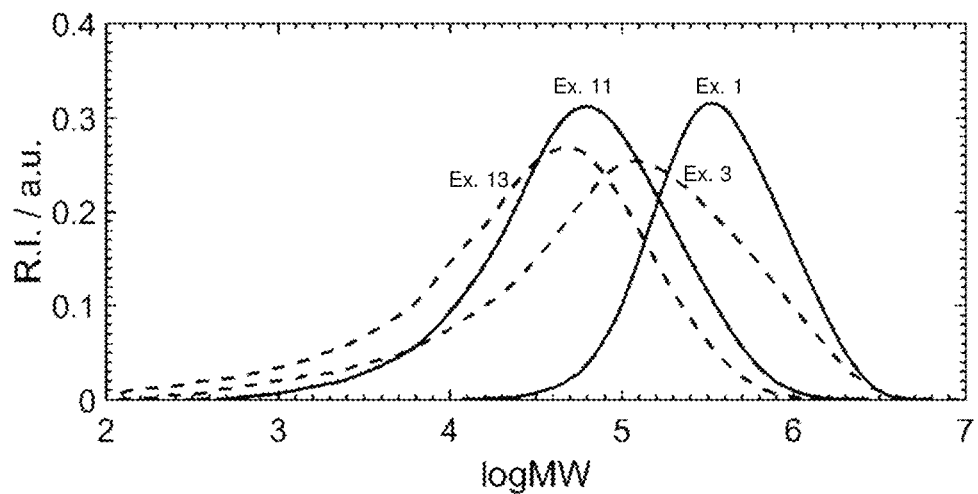
Figure 6E:
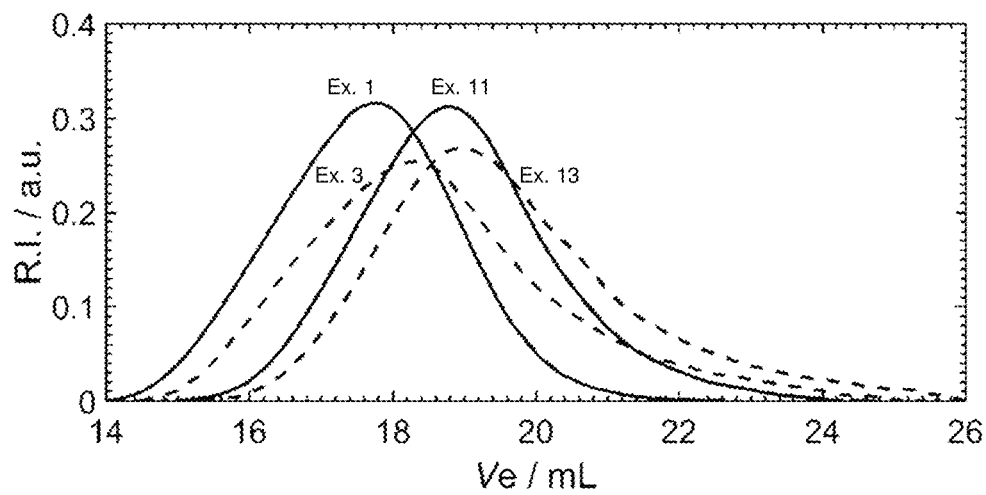

Four samples of copolymer of ethylene with butene-1 prepared with procatalyst A, activated with TEAL, were characterized by CEF (FIG. 6a), TGIC (FIG. 6b) and SGIC (FIG. 6c); the results are compared in order to shed light on the effects of Al/Ti and $H_2$ on the microstructures of these copolymers. CEF is a method based on the crystallizability of the sample fractions. It is not an excellent option for samples with high comonomer content which can produce a significant amount of amorphous (soluble at room temperature) fraction left unscrutinized. It often contains mixed fractions of high comonomer incorporation with fractions of low molecular weight. Moreover, fractions with molecular weight <20 KDa have elution temperatures that are dependent on the MW (so-called 'molecular weight effect'). Nevertheless, if adopting the sample prepared with Al/Ti=6 in the absence of $H_2$ as the reliable reference (molecular weight >20 KDa, see FIG. 6d), high Al/Ti is proved unambiguously to produce the fraction with significantly higher elution temperature.

TGIC and SGIC are both based on the interaction between polymer chains and the graphitic stationary phase. The strength of the interaction depends on the average length of the ethylene sequence for an ethylene/α-olefin random copolymer; whereas for a block copolymer the total length of the ethylene sequence is the determining factor. The TGIC and SGIC results show that higher Al/Ti results in increased fraction with low butene incorporation and decreased fraction of medium butene incorporation. Since the total butene incorporation in the copolymer is similar for all the samples, butene content in the rest part of the polymer is enriched.

Figure 7A:
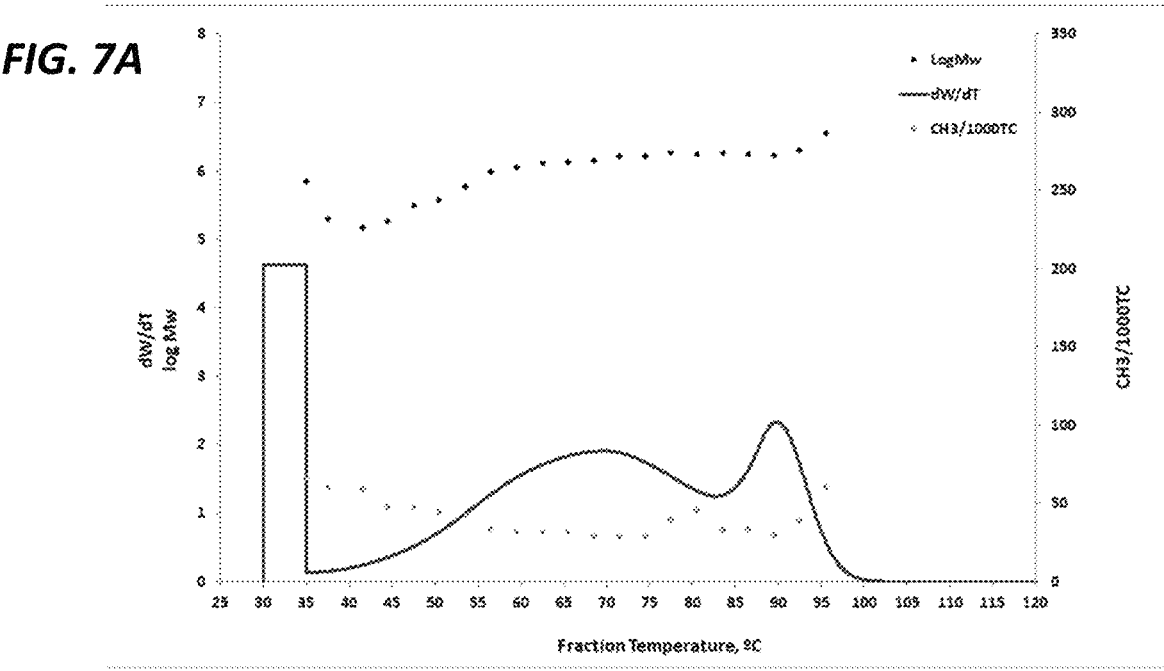
FIGS. 7A-B depict the TREF profile, measured by CFC, indicating the elution curve, the integral value for the amounts of the components, the molecular weight and the amount of the CH3/1000TC of the copolymer of ethylene with butene-1, prepared with gas phase containing 33% of C4/(C4+C2) with procatalyst A, activated with TEAL at different Al/Ti, obtained by conventional GPC and Example 4, which are eluted at 30° to 120° C.
Figure 7B:
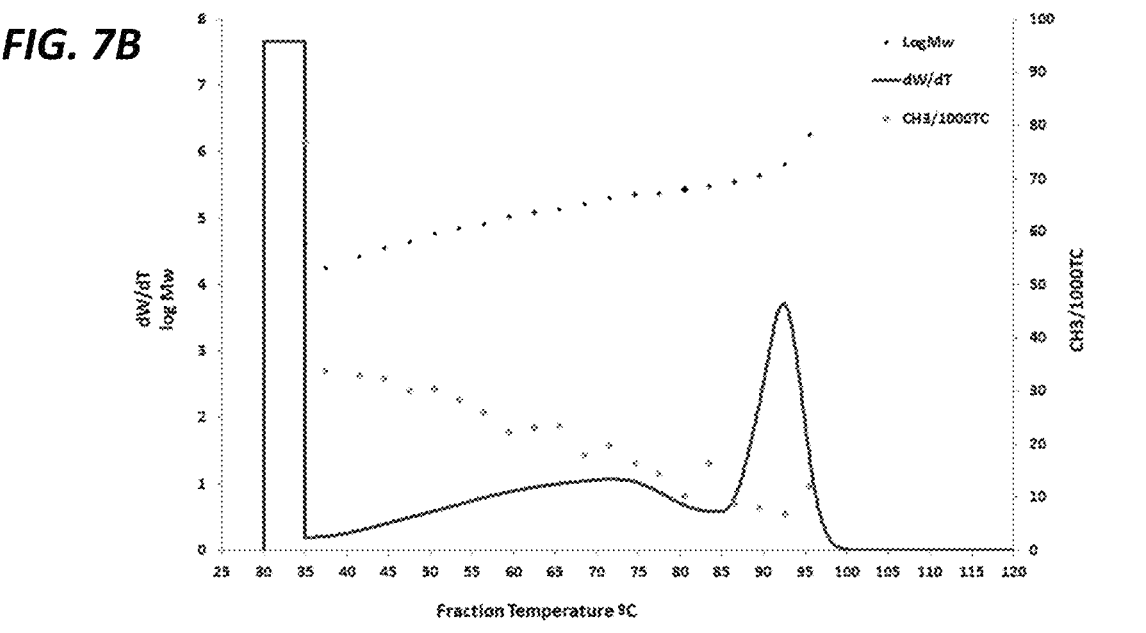
Figure 8:
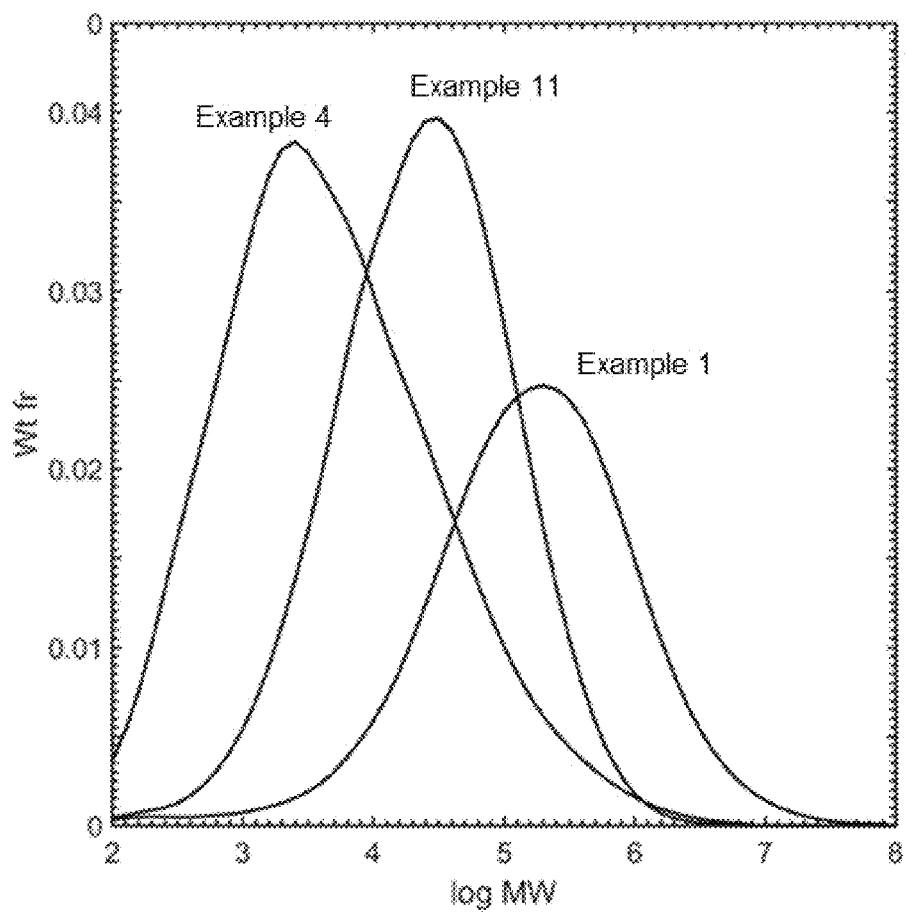
FIG. 8 is a comparison of conventional GPC curves for the eluted components of the copolymer of Example 1, Example 4 and Example 11, at a peak temperature range of 35° C. to 40° C. ($F_{sol}$).

Three samples of copolymer of ethylene with butene-1, prepared with gas phase containing 33% of C4/(C4+C2) with procatalyst A, activated with TEAL, were characterized by CFC. As in this condition, working with gas phase containing 33% of C4/(C4+C2), butene incorporation is quite high, all the samples give rise to a significant amount of Room Temperature soluble fraction ($F_{sol}$) which elutes at $T_e$=30-35° C. See $F_{sol}$ from Examples 1 and 11 at FIG. 7. Conventional GPC results (FIG. 8) showed that the soluble fraction with higher Al/Ti has significantly lower molecular weight. The addition of $H_2$ significantly changes the molecular weight of the $F_{sol}$.

Figure 10A:
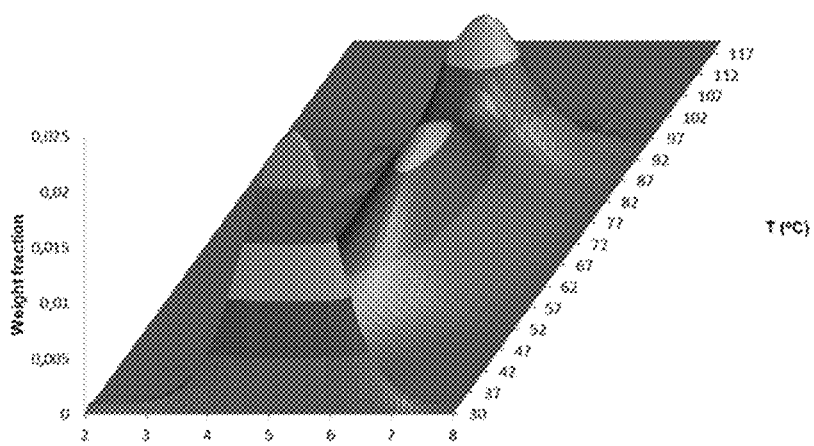
FIGS. 10A-C depict 3D CFC plots for the copolymer of Example 1, Example 4 and Example 11.
Figure 10B:
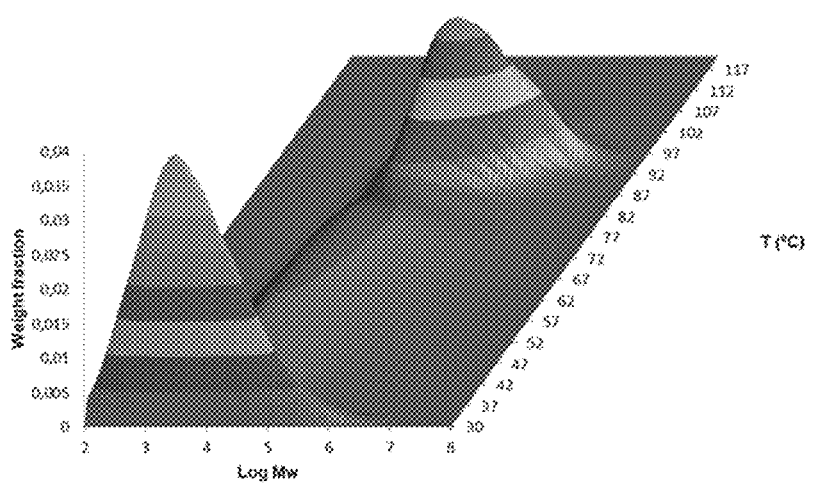
Figure 10C:
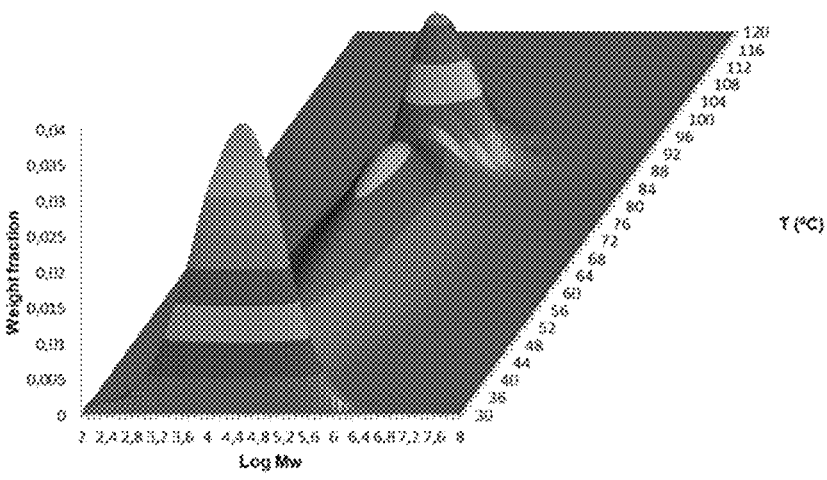

FIG. 18 shows the integrating areas from the TREF, measured by CFC instrument (S×1/Stotal, S×2/Stotal and S×3/Stotal), for these three samples of copolymer of ethylene with butene-1 and differences in the 2D projections and 3D CFC plots of the 3 samples can be seen in FIGS. 9 and 10. It can be verified that the integrated area S×2/Stotal, from Examples 1 and 11, is bigger than S×1/Stotal and S×3/Stotal, when compared to Example 4. It seems that the titanium sites which are good at incorporating comonomer are prone to chain transfer to alkylaluminum. The frequency of chain transfer reaction at a certain site is almost independent of the capability of comonomer incorporation when Al/Ti is low. It explains the flat CCD over MW at low Al/Ti and in line with CEF analysis. Overall, CFC results have straightforwardly demonstrated that the composition of the copolymer can be modulated in a remarkable range by adjusting the dosage of alkylaluminum and the addition of $H_2$.

Figure 11A:
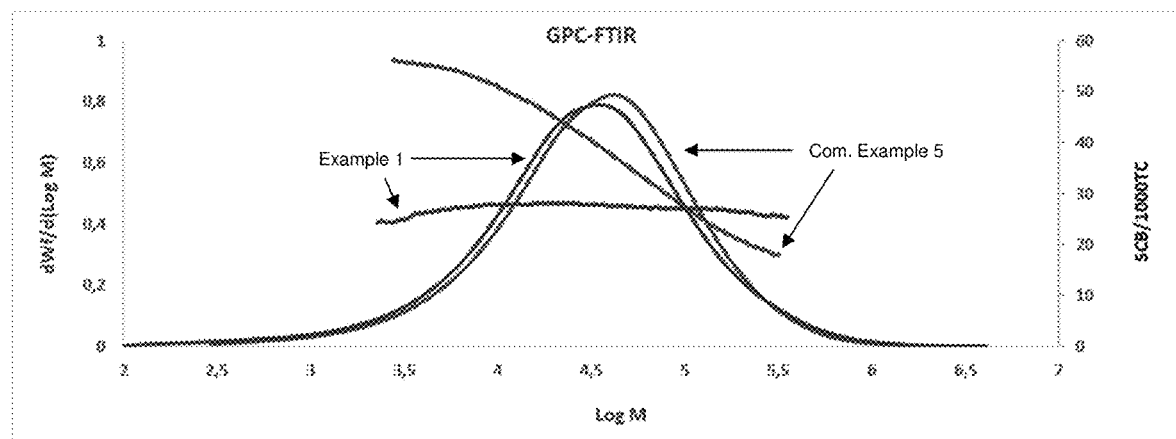
FIGS. 11A-B depict a comparison of GPC-FTIR curves of the copolymer of Example 1 and Comparative Example 5 and the linear regressions of the curves in the range of log(M) of 3.5 to 5.5.
Figure 11B:
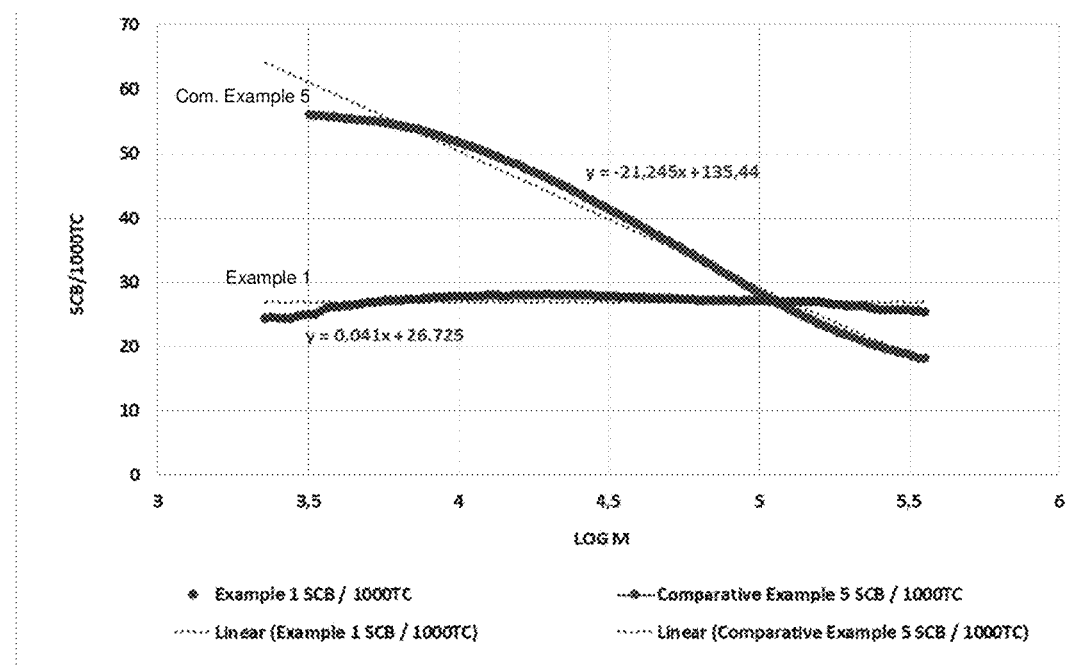

In FIG. 11A the GPC-FTIR results for the copolymers of ethylene with butene-1 prepared with the procatalyst A, activated with TEAL (Examples 1) and with the procatalyst Comparative B (Comparative Example 5) are shown. From these results it can be clearly seen that when TEAL was used as a cocatalyst for a typical $MgCl_2$ supported Ziegler-Natta procatalyst Comparative B (Comparative Example 5), the short chain branches/1000 total carbons (SCB/1000TC) vary from 60 down to 17 SCB/1000TC (71% decrease), indicating a very heterogeneous comonomer composition distribution. However, the activation of procatalyst A by TEAL showed that the SCB/1000TC varies only from 28 to 24 SCB/1000TC in Example 1 (13% decrease), indicating more homogeneous comonomer distribution as a function of molecular weight, meaning a substantially constant distribution of short chain branches per 1000 total carbons over the molecular weight distribution. That is, each molecular weight fraction from the low molecular weight end to the high molecular weight end have "more or less" the same amount of short chain branches per 1000 total carbons. In FIG. 11B it can be seen the equations describing the curves of SCB/1000TC for both polymers obtained by example 1 and Example Comparative 5 and both equations were obtained from the linear regression described by equation (1):

$$SCB/1000TC = b\log(M) + a \tag{1}$$

where b is the angular coefficient, a is the linear coefficient, and M is the molecular weight. When comparing the angular coefficient of the equation describing the SCB/1000TC curve of Example 1 with the angular coefficient of the equation describing the equation for Comparative Example 5, the value of b for Example 1 is much smaller than for Comparative Example 5, meaning a substantially constant distribution of short chain branches per 1000 total carbons over the molecular weight distribution. That is, each molecular weight fraction from the low molecular weight end to the high molecular weight end have "more or less" the same amount of short chain branches per 1000 total carbons.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words 'means for' together with an associated function.

What is claimed is:

1. A process of producing a composition comprising a copolymer of ethylene and one or more C4-C8 α-olefins, the process comprising:

copolymerizing the ethylene and the one or more C4-C8 α-olefins in the presence of a procatalyst and an alkylaluminum cocatalyst, wherein the procatalyst is a Ti-containing Ziegler Natta procatalyst, wherein polymerization comprises the procatalyst and the alkylaluminum cocatalyst in amounts such that a molar ratio of Al:Ti ranges from about 0.5 to about 50.0, and wherein the composition satisfies one or more of the following as determined by cross fractionation chromatography (CFC):

a weight average molecular weight ($M_w$) of a room temperature soluble fraction, eluted at 35° C. to 40° C., is at least 70 kDa, and a ratio Sx1/Stotal is 0.35 or less, where Sx1 is a sum of total peak areas of components that are eluted at 35° C. to 40° C., and Stotal is a sum of total peak areas of components that are eluted at 0 to 120° C.;

a weight average molecular weight (Mw) of a fraction eluted at 43° C. to 79° C., ranges from 140 kDa to 1750 kDa, and a ratio Sx2/Stotal is 0.43 or more, where Sx2 is a sum of total peak areas of components that are eluted at 43° C. to 79° C.; and a weight average molecular weight (Mw) of a fraction eluted at 82° C. to 120° C. ranges from 1800 kDa to 3600 kDa and a ratio Sx3/Stotal ranges from 0.20 to 0.28, where Sx3 is a sum of total peak areas of components that are eluted at 82° C. to 120° C.

2. The process of claim 1, wherein the composition has a substantially constant comonomer composition distribution (CCD) profile across the elution curve in the temperature rising elution fractionation (TREF) profile, as measured by CFC.

3. The process of claim 1, wherein the composition has, according to gel permeation chromatography coupled with Fourier transform infrared spectroscopy (GPC-FTIR), an angular coefficient b that ranges from −5 to 5 over a molecular weight (M) range of log(M) of 3.5 to 5.5, where the angular coefficient b is provided by a linear regression of a curve obtained by plotting short chain branches per 1000 total carbon atoms (SCB/1000TC) vs. log(M) according to equation SCB/1000TC=blog (M)+a, where a is a linear coefficient.

4. The process of claim 1, wherein the composition satisfies one or more of the following as determined by crystallization elution fractionation (CEF):

a room temperature soluble fraction, $F_{sol}$, which is soluble at a temperature below 30° C., has a ratio of A1/Atotal of 30 or less, where A1 is a sum of total peak areas of components that are eluted below 30° C. and Atotal is a sum of total peak areas of components that are eluted at 0 to 140° C.;

a fraction eluted at 40° C. to 80° C. has a ratio A2/Atotal of 40 or more, where A2 is a sum of total peak areas of components that are eluted at 40° C. to 80° C.; and a fraction eluted at 80° C. to 140° C. has a ratio A3/Atotal ranging from 28 to 40, where A3 is a sum of total peak areas related to components that are eluted at 80° C. to 140° C.

5. The process of claim 1, wherein the composition comprises a monomeric unit derived from one of the one or more C4-C8 α-olefins in an amount of 1 to 10 mol %, as measured by $^{13}C$ NMR.

6. The process of claim 1, wherein Sx1/Stotal is 0.35 or less and Sx2/Stotal is 0.65 or more.

7. The process of claim 1, wherein the composition has an SCB/1000TC variation, as measured by GPC-FTIR, of 30% or less.

8. The process of claim 1, wherein the composition has a number average molecular weight (Me) of at least about 10 kDa.

9. The process of claim 1, wherein the composition has a weight average molecular weight ($M_w$) that ranges from about 118 kDa to about 1,250 kDa.

10. The process of claim 1, wherein a molecular weight distribution (MWD) of the composition ranges from about 2 to 30.

11. The process of claim 1, wherein the composition has a crystallinity ($w_c$), as measured by DSC, ranging from about 20% to 50% and a melting temperature ($T_m$) ranging from about 110° C. to 125° C.

12. The process of claim 1, wherein the composition has a density, as measured in accordance with ASTM D-792, ranging from about 0.900 to 0.950 $g/cm^3$.

13. The process of claim 1, wherein the polymerization is a gas-phase polymerization.

14. The process of claim 1, wherein the polymerization occurs in a plurality of reactors in series.

15. The process of claim 1, wherein the alkylaluminum cocatalyst is a trialkylaluminum, wherein the trialkylaluminum is one or more selected from the group consisting of trimethylaluminum, triethylaluminum, and triisobutylaluminum.

16. The process of claim 1, wherein the molar ratio of Al:Ti ranges from 3 to 24.

17. The process of claim 1, wherein the Ti-containing Ziegler-Natta procatalyst comprises:

a particulate silica carrier in an amount of 65 to 85% by weight of the procatalyst; and a catalytically active portion in an amount of 15 to 35% by weight of the procatalyst.

18. The process of claim 17, wherein the Ti-containing Ziegler-Natta procatalyst is synthesized by a process comprising the steps of:

(a) impregnating an activated particulate silica using a solution of a group 13 organometallic compound in an amount ranging from 0.1 to 1 mmole of an organometallic solution per mmole of OH on a silica surface, in an inert organic solvent;

(b) removing a supernatant liquid from the step (a);

(c) preparing a solution obtained by reacting at least one magnesium compound, selected from magnesium halides or magnesium alkoxides, in an amount ranging from 0.0024 to 0.24 g of magnesium per g of silica, and at least one titanium compound, selected from titanium alkoxides or titanium halogen alkoxides, in an amount ranging from 0.01 to 1 g of titanium per g of silica;

(d) impregnating the silica obtained in (b) using the solution prepared in (c);

(e) optionally reacting a solid obtained in (d) with a reducing agent selected from the group consisting of Na alkyls, Li-alkyls, Zn-alkyls, Mg-alkyls and corresponding aryl-derivatives, Grignard compounds of the type RMgX, polyhydrosiloxanes, wherein R represents a linear or branched alkyl group, containing from 1 to 10 carbons or aryl-derivatives and X represents a halogen atom, and Al-alkyl halide or silicon compounds;

(f) reacting a solid obtained in (d) or (e) with a halogenating agent selected from the group consisting of methylaluminum dichloride, methylaluminum sesquichloride, isobutylaluminum dichloride, isobutylaluminum sesquichloride, ethylaluminum dichloride (EADC), diethylaluminum chloride (DEAC), ethylaluminum sesquichloride (EASC), SiCl4, SnCl4, HCl, Cl2, HSiCl3, aluminium chloride, ethylboron dichloride, boron chloride, diethylboron chloride, HCCl3, PCl3, POCl3, acetyl chlorides, thionyl chloride, sulfur chloride, methyl trichlorosilane, dimethyl dichlorosilane, TiCl4, VCl4, CCl4, t-butylchloride, n-butyl chloride, chloroform, 1,1,1-trichloroethane, 1,1,2-trichloroethane, 1,2-dichloroethane and dichloromethane;

(g) maintaining a solid obtained in (f) at a temperature from 60° C. to 120° C. from 0.5 hour to 5 hours;

(h) washing a solid obtained in (g) with an inert organic solvent;

(i) optionally washing the solid obtained in (h) with a solution of one or more organometallic compounds of group 13 of the periodic table in an amount ranging from 0 to 3 g of the organometallic compound per g of a dry procatalyst component obtained.

19. The process of claim 17, wherein the Ti-containing Ziegler-Natta procatalyst is free of polar solvents and electron donors and exhibits a UV-Vis spectrum whose deconvolution results in five Gaussian curves, where each curve represents a different species of titanium and which are represented with the following peak characteristics:

Peak 1: $Xc1$=250-270 nm; $w1$=32.31353 nm; $A1$=1145.17026 a.u.

Peak 2: $Xc2$=270-290 nm; $w2$=24.84062 nm; $A2$=733.4054 a.u.

Peak 3: $Xc3$=290-330 nm; $w3$=23.16927 nm; $A3$=738.23771 a.u.

Peak 4: $Xc4$=330-340 nm; $w4$=18.78731 nm; $A4$=417.17556 a.u.

Peak 5: $Xc5$=340-350 nm; $w5$=7.92537 nm; $A5$=69.57565 a.u.

where Xc represents peak maximum wavelength, w represents peak width at half height and A represents peak area.

20. The process of claim 17, wherein the Ti-containing Ziegler-Natta procatalyst further comprises magnesium and chlorine, and wherein the titanium, magnesium, and chlorine are all active components, wherein the procatalyst comprises the magnesium, in an amount ranging from about 0.3 to 5% by weight, the titanium in an amount ranging from about 0.5 to 10% by weight and other ligands, one or more alkoxy group-containing compounds, and a Group 13 organometallic compound, in a total amount ranging from about 0.3 to 5% by weight and the Ti-containing Ziegler-Natta procatalyst is supported on an activated particulate silica carrier.

21. A composition produced by the process of claim 1.

22. A process of producing a composition comprising a copolymer of ethylene and one or more C4-C8 α-olefins, the process comprising:

copolymerizing the ethylene and the one or more C4-C8 α-olefins in the presence of a procatalyst and an alkylaluminum cocatalyst, wherein the procatalyst is a Ti-containing Ziegler Natta procatalyst, wherein the polymerization comprises the procatalyst and the alkylaluminum cocatalyst in amounts such that a molar ratio of Al:Ti ranges from about 0.5 to about 50.0, and wherein the composition has, according to gel permeation chromatography coupled with Fourier transform infrared spectroscopy (GPC-FTIR), an angular coefficient b that ranges from −5 to 5 over a molecular weight (M) range of log(M) of 3.5 to 5.5, where the angular coefficient b is provided by a linear regression of a curve obtained by plotting short chain branches per 1000 total carbon atoms (SCB/1000TC) vs. log(M) according to equation SCB/1000TC=blog (M)+a, where a is a linear coefficient, and wherein the composition has a molecular weight distribution ranging from about 3 to 10.

23. A composition, comprising a copolymer of ethylene and one or more C4-C8 α-olefins, wherein the composition satisfies one or more of the following as determined by cross fractionation chromatography (CFC):

a weight average molecular weight ($M_w$) of a room temperature soluble fraction, eluted at 35° C. to 40° C., is at least 70 kDa, and a ratio S×1/Stotal is 0.35 or less, where S×1 is a sum of total peak areas of components that are eluted at 35° C. to 40° C., and Stotal is a sum of total peak areas of components that are eluted at 0 to 120° C.;

a weight average molecular weight (Mw) of a fraction eluted at 43° C. to 79° C., ranges from 140 kDa to 1750 kDa, and a ratio S×2/Stotal is 0.43 or more, where S×2 is a sum of total peak areas of components that are eluted at 43° C. to 79° C.; and a weight average molecular weight (Mw) of a fraction eluted at 82° C. to 120° C. ranges from 1800 kDa to 3600 kDa and a ratio S×3/Stotal ranges from 0.20 to 0.28, where S×3 is a sum of total peak areas of components that are eluted at 82° C. to 120° C.

24. The composition of claim 23, wherein the composition has a substantially constant comonomer composition distribution (CCD) profile across the elution curve in the temperature rising elution fractionation (TREF) profile, as measured by CFC.

25. The composition of claim 23, wherein the composition has, according to gel permeation chromatography coupled with Fourier transform infrared spectroscopy (GPC-FTIR), an angular coefficient b that ranges from −5 to 5 over a molecular weight (M) range of log(M) of 3.5 to 5.5, where the angular coefficient b is provided by a linear regression of a curve obtained by plotting short chain branches per 1000 total carbon atoms (SCB/1000TC) vs. log(M) according to equation SCB/1000TC=blog (M)+a, where a is a linear coefficient.

26. The composition of claim 23, wherein the composition satisfies one or more of the following as determined by crystallization elution fractionation (CEF):

a room temperature soluble fraction, $F_{sol}$, which is soluble at a temperature below 30° C., has a ratio of A1/Atotal of 30 or less, where A1 is a sum of total peak areas of components that are eluted below 30° C. and Atotal is a sum of total peak areas of components that are eluted at 0 to 140° C.;

a fraction eluted at 40° C. to 80° C. has a ratio A2/Atotal of 40 or more, where A2 is a sum of total peak areas of components that are eluted at 40° C. to 80° C.; and a fraction eluted at 80° C. to 140° C. has a ratio A3/Atotal ranging from 28 to 40, where A3 is a sum of total peak areas related to components that are eluted at 80° C. to 140° C.

27. The composition of claim 23, wherein the composition comprises a monomeric unit derived from one of the one or more C4-C8 α-olefins in an amount of 1 to 10 mol %, as measured by $^{13}$C NMR.

28. The composition of claim 23, wherein S×1/Stotal is 0.35 or less and S×2/Stotal is 0.65 or more.

29. The composition of claim 23, wherein the composition has an SCB/1000TC variation, as measured by GPC-FTIR, of 30% or less.

30. The composition of claim 23, wherein the composition has a number average molecular weight (Me) of at least about 10 kDa.

31. The composition of claim 23, wherein the composition has a weight average molecular weight ($M_w$) that ranges from about 118 kDa to about 1,250 kDa.

32. The composition of claim 23, wherein a molecular weight distribution (MWD) of the composition ranges from about 2 to 30.

33. The composition of claim 23, wherein the composition has a crystallinity ($w_c$), as measured by DSC, ranging from about 20% to 50% and a melting temperature ($T_m$) ranging from about 110° C. to 125° C.

34. The composition of claim 23, wherein the composition has a density, as measured in accordance with ASTM D-792, ranging from about 0.900 to 0.950 g/cm$^3$.

35. An article comprising the composition of claim 23.

\* \* \* \* \*